United States Patent
Xing

(10) Patent No.: US 8,634,645 B2
(45) Date of Patent: Jan. 21, 2014

(54) METHOD AND TOOL FOR RECOGNIZING A HAND-DRAWN TABLE

(75) Inventor: Zhaohui Xing, Calgary (CA)

(73) Assignee: SMART Technologies ULC (CA)

( * ) Notice: Subject to any disclaimer, the term of this patent is extended or adjusted under 35 U.S.C. 154(b) by 1375 days.

(21) Appl. No.: 12/058,234

(22) Filed: Mar. 28, 2008

(65) Prior Publication Data

US 2009/0245645 A1 Oct. 1, 2009

(51) Int. Cl.
G06K 9/00 (2006.01)
G06K 9/18 (2006.01)
G06K 9/22 (2006.01)

(52) U.S. Cl.
USPC ........... 382/186; 382/189; 382/181; 382/312; 382/314

(58) Field of Classification Search
USPC ......... 382/181, 185, 186, 187, 188, 189, 312, 382/314; 345/156, 443
See application file for complete search history.

(56) References Cited

U.S. PATENT DOCUMENTS

| | | | | |
|---|---|---|---|---|
| 5,392,130 A | * | 2/1995 | Mahoney | 358/400 |
| 5,448,263 A | * | 9/1995 | Martin | 345/173 |
| 5,805,168 A | * | 9/1998 | Minakata | 345/427 |
| 6,012,073 A | * | 1/2000 | Arend et al. | 715/236 |
| 6,141,000 A | * | 10/2000 | Martin | 345/178 |
| 6,337,681 B1 | * | 1/2002 | Martin | 345/178 |
| 6,415,305 B1 | | 7/2002 | Agrawal et al. | |
| 6,747,636 B2 | * | 6/2004 | Martin | 345/178 |
| 6,763,148 B1 | * | 7/2004 | Sternberg et al. | 382/293 |
| 6,803,906 B1 | * | 10/2004 | Morrison et al. | 345/173 |
| 6,952,803 B1 | * | 10/2005 | Bloomberg et al. | 715/236 |
| 7,106,904 B2 | * | 9/2006 | Shima | 382/216 |
| 7,184,606 B2 | * | 2/2007 | Shindo et al. | 382/255 |
| 7,222,986 B2 | * | 5/2007 | Mah | 362/202 |
| 7,236,162 B2 | * | 6/2007 | Morrison et al. | 345/173 |
| 7,250,968 B2 | * | 7/2007 | Ito | 348/240.2 |
| 7,274,756 B2 | * | 9/2007 | Kuijk | 375/340 |
| 7,583,841 B2 | * | 9/2009 | Lin et al. | 382/186 |
| 7,751,623 B1 | * | 7/2010 | Simmons et al. | 382/186 |
| 7,865,018 B2 | * | 1/2011 | Abdulkader et al. | 382/186 |
| 8,054,971 B2 | * | 11/2011 | Weiner | 380/247 |
| 8,150,162 B2 | * | 4/2012 | Du et al. | 382/187 |
| 8,201,084 B2 | * | 6/2012 | Konno | 715/243 |
| 8,385,651 B2 | * | 2/2013 | Zhang et al. | 382/176 |
| 2001/0024520 A1 | * | 9/2001 | Yamaai | 382/199 |

(Continued)

FOREIGN PATENT DOCUMENTS

| CN | 101452523 | * | 6/2009 |
|---|---|---|---|
| CN | 101452523 A | | 6/2009 |
| EP | 1 519 280 A2 | | 3/2005 |

OTHER PUBLICATIONS

Glenn et al. "Word 2000 in a Nutshell" Chapter 10 1st Edition, Aug. 2000, pp. 1-22.*

(Continued)

*Primary Examiner* — Chan S Park
*Assistant Examiner* — Mia M Thomas
(74) *Attorney, Agent, or Firm* — Katten Muchin Rosenman LLP

(57) ABSTRACT

A computerized method of recognizing an input hand-drawn table formed by freeform line objects comprises transforming each freeform line object of the table into one of a vertical line segment and a horizontal line segment, generating a grid system based on the vertical and horizontal line segments and converting the generated grid system into a table object.

38 Claims, 18 Drawing Sheets

(56) References Cited

U.S. PATENT DOCUMENTS

| | | | |
|---|---|---|---|
| 2002/0107885 A1* | 8/2002 | Brooks et al. | 707/505 |
| 2002/0159639 A1* | 10/2002 | Shima | 382/218 |
| 2003/0095708 A1* | 5/2003 | Pittel | 382/187 |
| 2003/0113016 A1* | 6/2003 | Naoi et al. | 382/181 |
| 2003/0123732 A1* | 7/2003 | Miyazaki et al. | 382/186 |
| 2003/0174220 A1* | 9/2003 | Ito | 348/240.2 |
| 2003/0214491 A1* | 11/2003 | Keely et al. | 345/179 |
| 2004/0008883 A1* | 1/2004 | Shi et al. | 382/158 |
| 2005/0001824 A1* | 1/2005 | Yoshimura | 345/179 |
| 2005/0093845 A1* | 5/2005 | Brooks et al. | 345/179 |
| 2005/0094854 A1* | 5/2005 | Kim | 382/118 |
| 2005/0226535 A1* | 10/2005 | Ghosh | 382/294 |
| 2006/0126938 A1* | 6/2006 | Lee et al. | 382/190 |
| 2006/0132455 A1* | 6/2006 | Rimas-Ribikauskas et al. | 345/173 |
| 2006/0132456 A1* | 6/2006 | Anson | 345/173 |
| 2006/0132457 A1* | 6/2006 | Rimas-Ribikauskas et al. | 345/173 |
| 2006/0239560 A1* | 10/2006 | Sternby | 382/187 |
| 2007/0092140 A1* | 4/2007 | Handley | 382/176 |
| 2007/0097102 A1* | 5/2007 | Keely et al. | 345/179 |
| 2007/0140565 A1* | 6/2007 | Lin et al. | 382/203 |
| 2007/0140566 A1* | 6/2007 | Lin et al. | 382/203 |
| 2007/0186152 A1* | 8/2007 | Gurcan et al. | 715/509 |
| 2007/0195084 A1* | 8/2007 | Cheung et al. | 345/420 |
| 2008/0075368 A1* | 3/2008 | Kuzmin | 382/187 |
| 2008/0285069 A1* | 11/2008 | Yasuda | 358/1.15 |
| 2009/0245645 A1* | 10/2009 | Xing | 382/189 |
| 2009/0245654 A1* | 10/2009 | Xing et al. | 382/203 |
| 2010/0123719 A1* | 5/2010 | Xing | 345/443 |
| 2010/0178645 A1* | 7/2010 | Ieperen et al. | 434/323 |
| 2010/0201812 A1* | 8/2010 | McGibney et al. | 348/143 |
| 2010/0313155 A1* | 12/2010 | Willekes et al. | 715/769 |
| 2011/0199297 A1* | 8/2011 | Antonyuk et al. | 345/157 |
| 2011/0216015 A1* | 9/2011 | Edwards | 345/173 |
| 2012/0223920 A1* | 9/2012 | Brooks et al. | 345/179 |
| 2013/0044954 A1* | 2/2013 | Ashbrook | 382/187 |

OTHER PUBLICATIONS

Supplementary European Search Report and Annex to the European Search Report for European Patent Application No. EP 09725195 with a date of completion of Feb. 13, 2012.

Jul. 3, 2012 letter from China Sinda to Sim & McBurney with a summary in English of the Jun. 12, 2012 First Office Action for Chinese Patent Application No. 200980111413.4 and a copy of the Office Action in Chinese.

\* cited by examiner

METHOD AND TOOL FOR RECOGNIZING A HAND-DRAWN TABLE

FIELD OF THE INVENTION

The present invention relates generally to digital ink processing and in particular, to a method and tool for recognizing a hand-drawn table.

BACKGROUND OF THE INVENTION

Interactive input systems that allow users to input ink into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices. Although these interactive input systems are able to recognize handwriting well, their ability to recognize and represent the meaning of hand-drawn objects and in particular, charts or tables, has been limited.

Microsoft Office software includes a feature that enables tables to be created by moving a cursor over an open document. During table creation, cursor movements over the open document are translated immediately into one of rectangles, squares and straight lines. Although tables can be created, the functionality of this feature limits its ease of use in interactive input systems that accept freeform or handwritten ink as input. As will be appreciated, improvements in hand-drawn table recognition are desired.

It is therefore an object of the present invention to provide a novel method and tool for recognizing a hand-drawn table.

SUMMARY OF THE INVENTION

Accordingly, in one aspect there is provided a computerized method of recognizing an input hand-drawn table formed by freeform line objects, said method comprising:

transforming each freeform line object of said table into one of a vertical line segment and a horizontal line segment;

generating a grid system based on the vertical and horizontal line segments; and converting the generated grid system into a table object.

According to another aspect there is provided a computerized digital ink recognition method comprising:

selecting digital ink presented on a graphical user interface, said digital ink at least comprising intersecting freeform lines representing a hand-drawn table; and performing a recognition procedure on said intersecting freeform lines to recognize the hand-drawn table;

generating a table object corresponding to the hand-drawn table in response to recognition thereof.

According to another aspect there is provided a computer readable medium embodying computer program code for digital ink recognition, said computer program code comprising:

program code for selecting digital ink presented on a graphical user interface, said digital ink at least comprising intersecting freeform lines representing a hand-drawn table;

program code for performing a recognition procedure on said intersecting freeform lines to recognize the hand-drawn table;

program code for generating a table object corresponding to the hand-drawn table in response to recognition thereof.

According to yet another aspect there is provided a computer readable medium embodying computer program code for recognizing an input hand-drawn table formed by freeform line objects, said computer program code comprising:

program code for transforming each freeform line object of said table into one of a vertical line segment and a horizontal line segment;

program code for generating a grid system based on the vertical and horizontal line segments; and program code for converting the generated grid system into a table object.

According to still yet another aspect there is provided an interactive input system comprising:

a coordinate input device having a display surface on which an image is presented, said coordinate input device being responsive to user input; and processing structure communicating with said coordinate input device and updating the image presented on said display surface to reflect user input, said processing structure executing a table recognition procedure when invoked to recognize a hand-drawn table entered on said coordinate input device and convert the recognized hand-drawn table into a table object.

BRIEF DESCRIPTION OF THE DRAWINGS

Embodiments will now be described more fully with reference to the accompanying drawings in which.

DETAILED DESCRIPTION OF THE EMBODIMENTS

In the following, a software tool and method for recognizing freeform or hand-drawn tables input into an interactive input system such as those referred above, is described. The software tool when executed by a processing device transforms the freeform line objects or "lines" forming the hand-drawn table into horizontal and vertical line segments, generates a grid system based on the vertical and horizontal line segments and converts the generated grid system into a table object that is compatible with conventional word processing software such as for example Microsoft Word™.

Figure 1A:
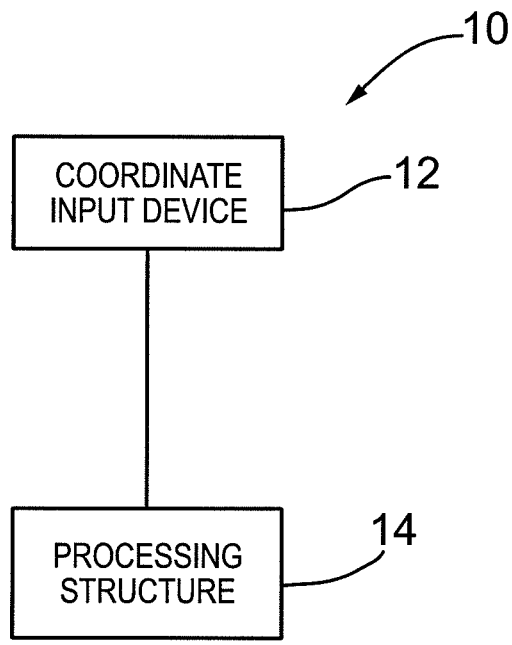
FIG. 1a is a block diagram of an interactive input system.

Turning now to FIG. 1a, a block diagram of an interactive input system is shown and is generally identified by reference numeral 10. Interactive input system 10 comprises a coordinate input device 12 such as for example a touch panel on which pointer contacts can be made. The coordinate input device 12 communicates with processing structure 14 executing one or more application programs. Image data generated by the processing structure 14 is displayed on the display surface of the coordinate input device 12 allowing a user to interact with the displayed image via pointer contacts on the coordinate input device. The processing structure 14 interprets pointer contacts as input to the running application program and updates the image data accordingly so that the image displayed on the display surface reflects the pointer activity. In this manner, the coordinate input device 12 and processing structure 14 form a closed loop allowing pointer interactions with the coordinate input device 12 to be recorded as handwriting or drawing or used to control execution of the application program. The coordinate input device 12 of the interactive input system 10 may be separate from the processing structure 14 as is shown in the above-incorporated patents assigned to SMART Technologies ULC or may be combined with the processing structure to form an integral compact unit as in the case of tablet PCs and PDAs.

The processing structure 14 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

The processing structure 14 runs a host software application such as SMART Notebook™ offered by SMART Technologies ULC. As is known, during execution, the SMART Notebook™ application provides a graphical user interface comprising a canvas page or palette, that is presented on the display surface of the coordinate input device 12 on which freeform or handwritten ink objects and other objects can be input and manipulated via pointer interaction with the coordinate input device. The SMART Notebook™ application in this embodiment, is provided with a tool for recognizing hand-drawn tables and converting such tables into corresponding table objects.

Figure 1B:
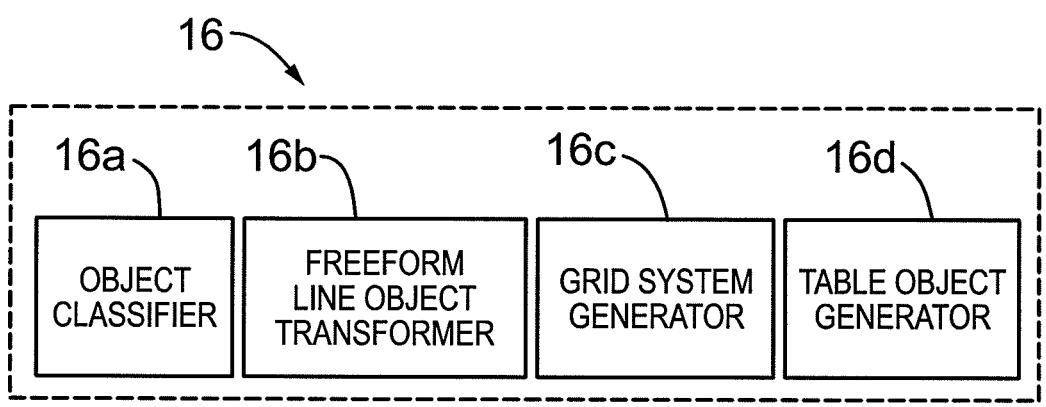
FIG. 1b is a block diagram showing the components of a hand-drawn table recognizing tool.

FIG. 1b is a block diagram showing the components of the hand-drawn table recognizing tool 16. As can be seen, the hand-drawn table recognizing tool comprises an object classifier 16a to classify selected objects into table outline elements and table cell content elements, a freeform line object transformer 16a to transform table outline elements into vertical and horizontal line segments, a grid system generator 16c to create a grid system identifying the intersection points of the vertical and horizontal line segments and a table object generator 16d to create a table object based on the intersection points.

Figure 2A:
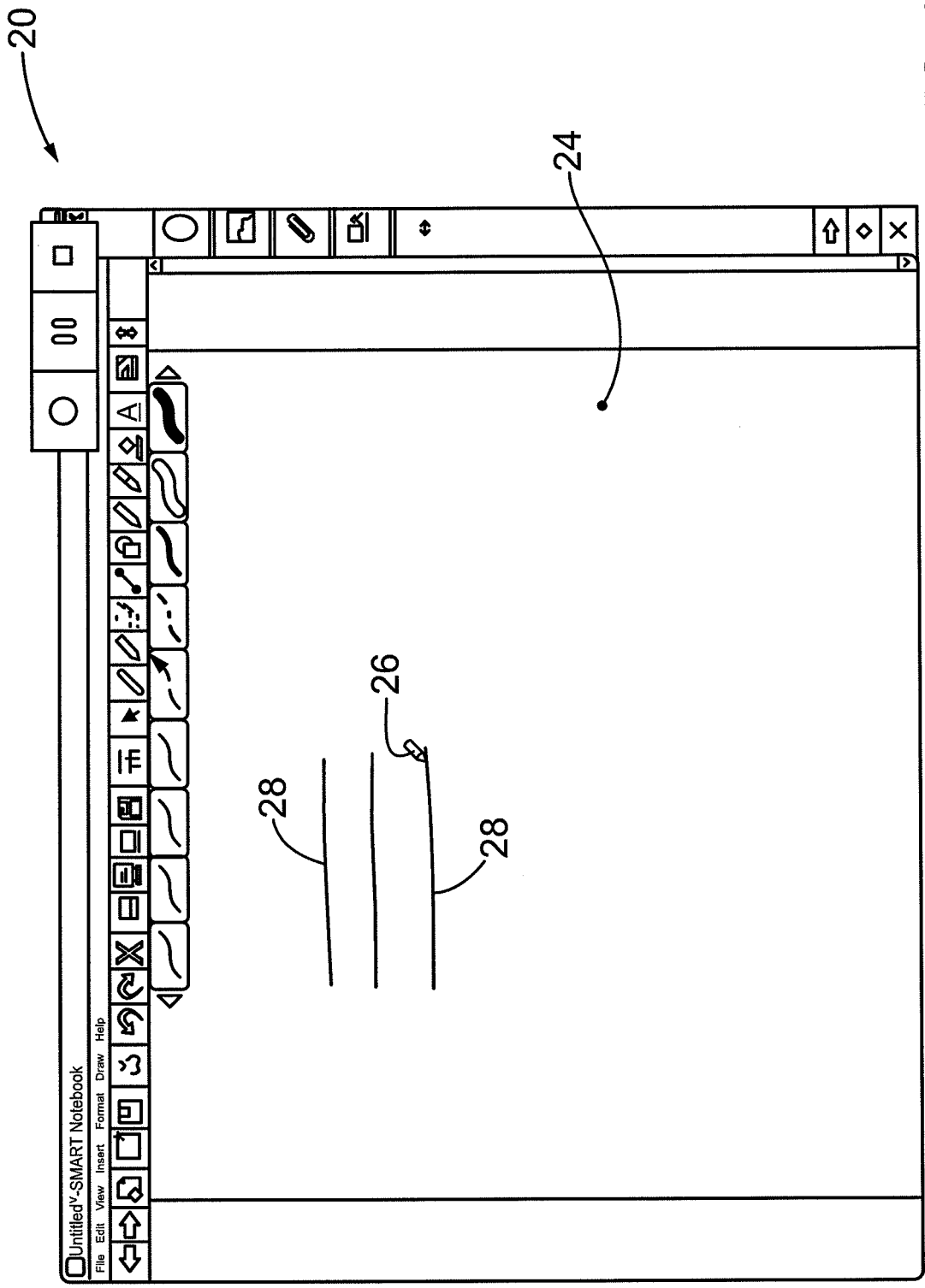
FIGS. 2a to 2e show a graphical user interface presented on the display surface of a coordinate input device during hand-drawn table creation and recognition.
Figure 2B:
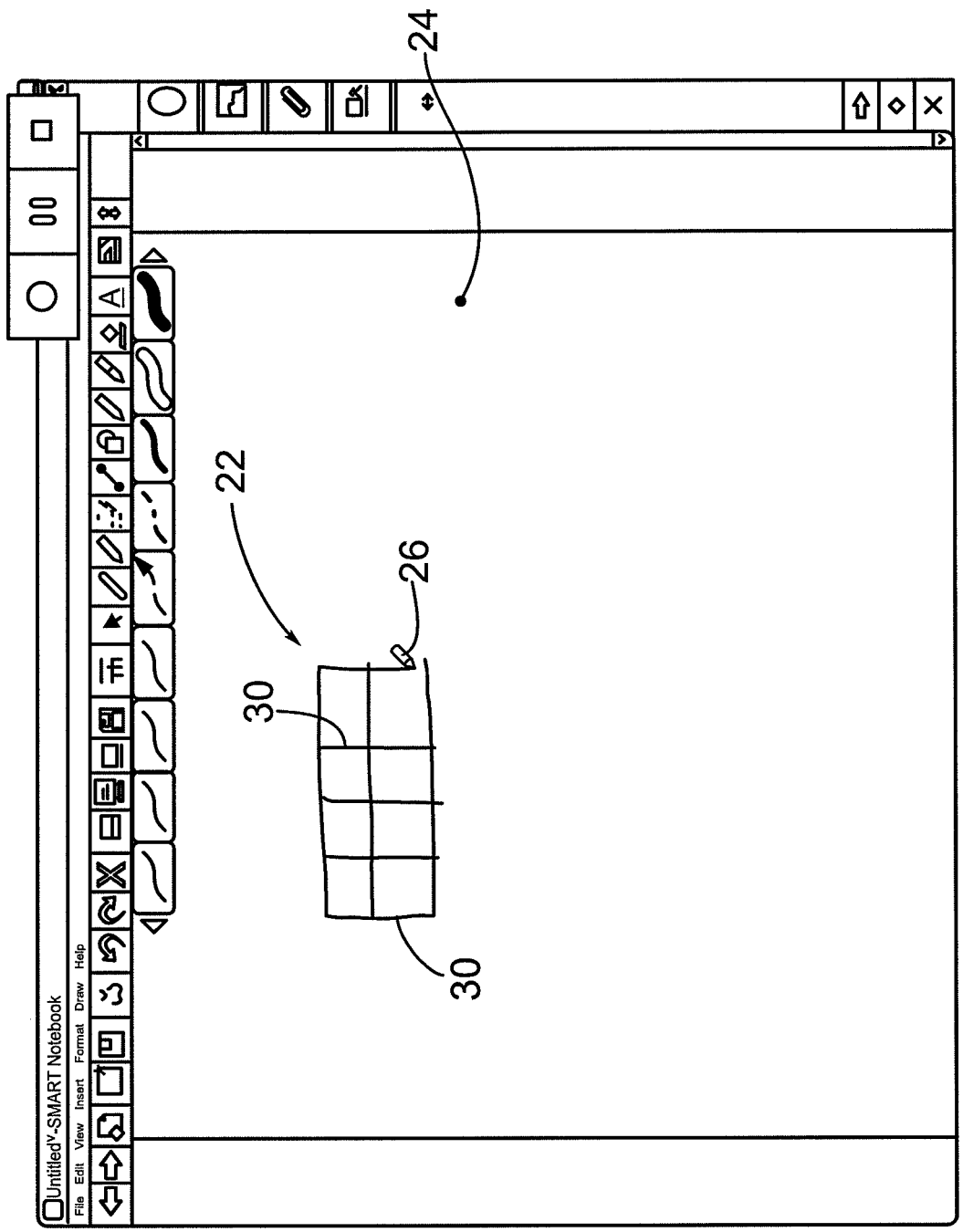

FIGS. 2a and 2b show the graphical user interface 20 presented on the display surface of the coordinate input device 12. In FIGS. 2a and 2b, a hand-drawn table 22 is being input on the canvas page 24 of the graphical user interface 20 in response to movement of a pointer 26 across the display surface of the coordinate input device 12. In this embodiment, the generally horizontal freeform lines 28 forming the hand-drawn table 22 are input first followed by the generally vertical freeform lines 30. After the hand-drawn table 12 has been input on the canvas page 24, the hand-drawn table 22 can be recognized and converted into a table object by selecting or highlighting the hand-drawn table 22 then invoking the hand-drawn table recognizing tool 16.

Figure 2C:
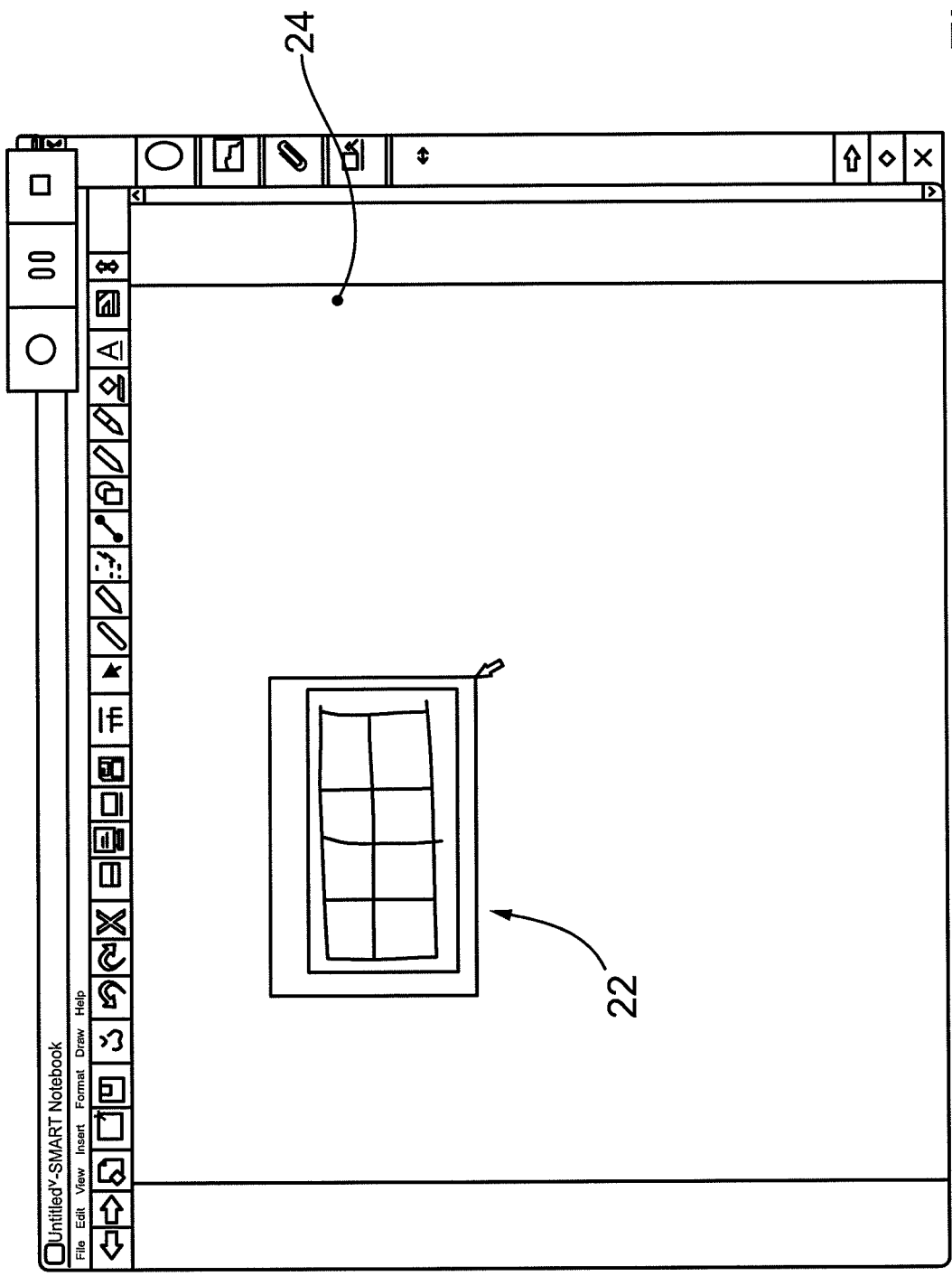
Figure 2D:
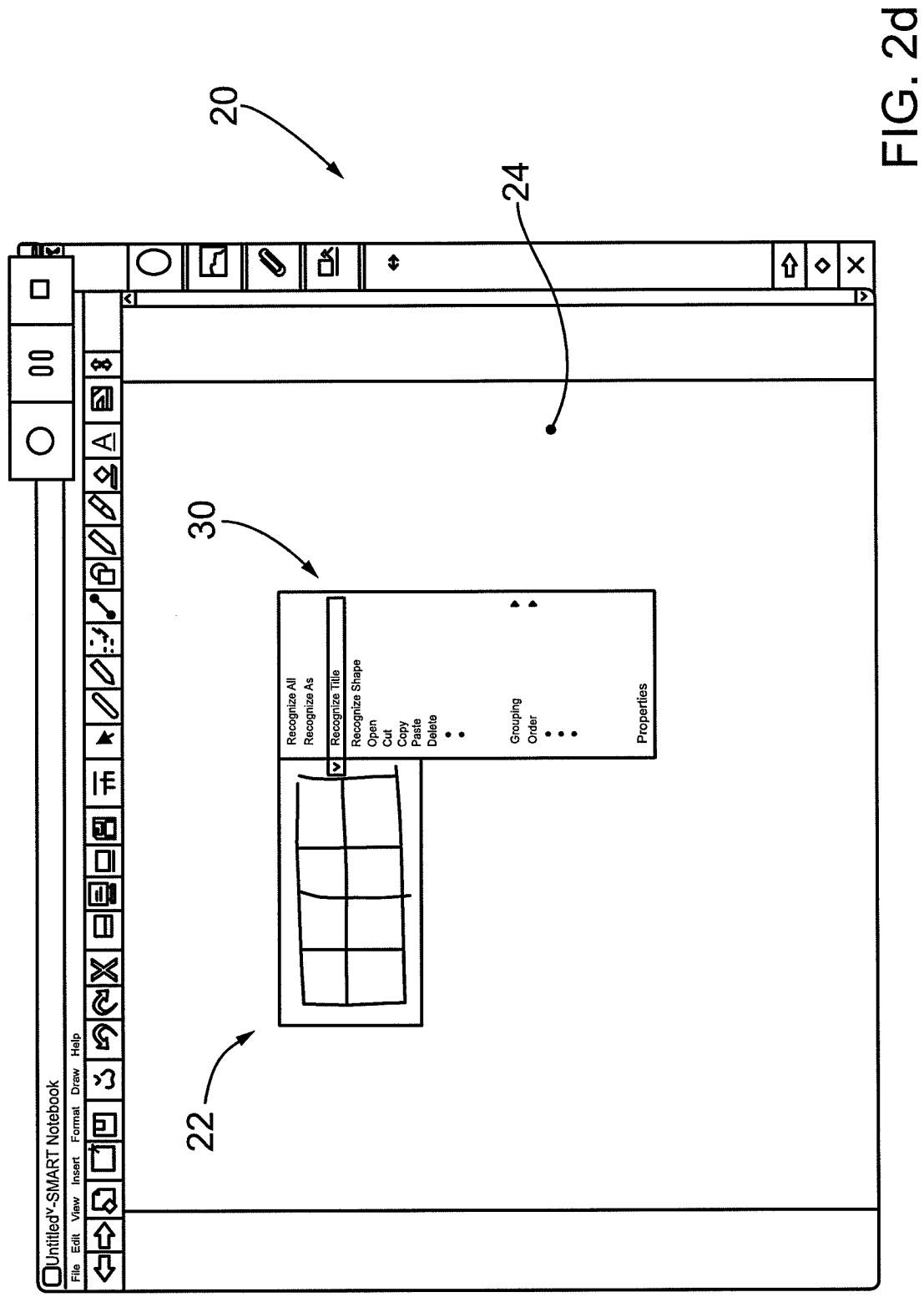
Figure 2E:
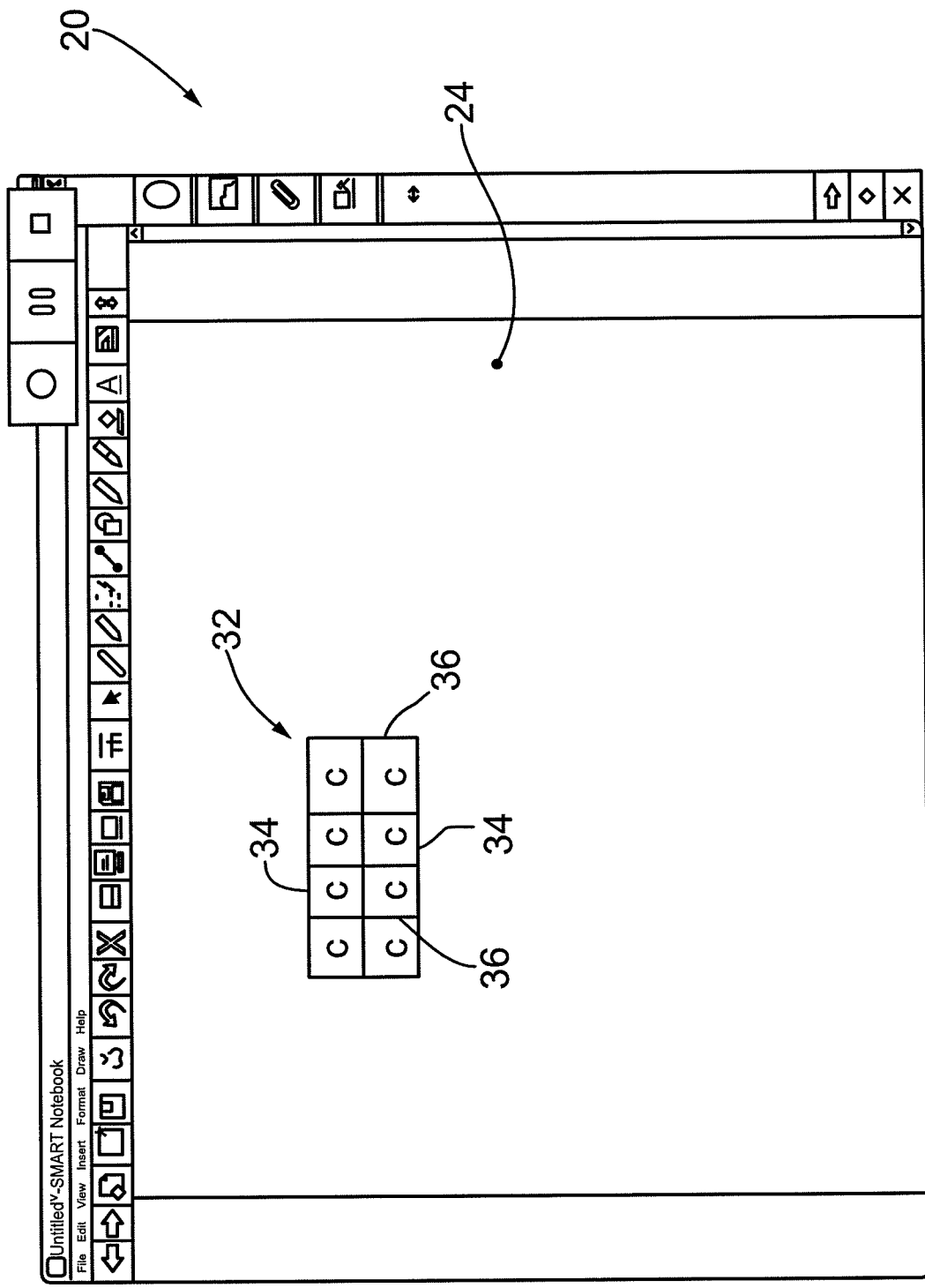

FIGS. 2c and 2d show the hand-drawn table 22 when selected as well as a drop-down menu 30 that is presented to the user allowing the user to select and invoke the hand-drawn table recognizing tool 16. Once invoked, the hand-drawn table recognizing tool 16 converts the hand-drawn table into a table object 32 with straight horizontal and vertical lines 34 and 36 respectively as shown in FIG. 2e. As will be appreciated, the cells C of the table object 32 have dimensions generally corresponding to those of the hand-drawn table 22.

Figure 3A:
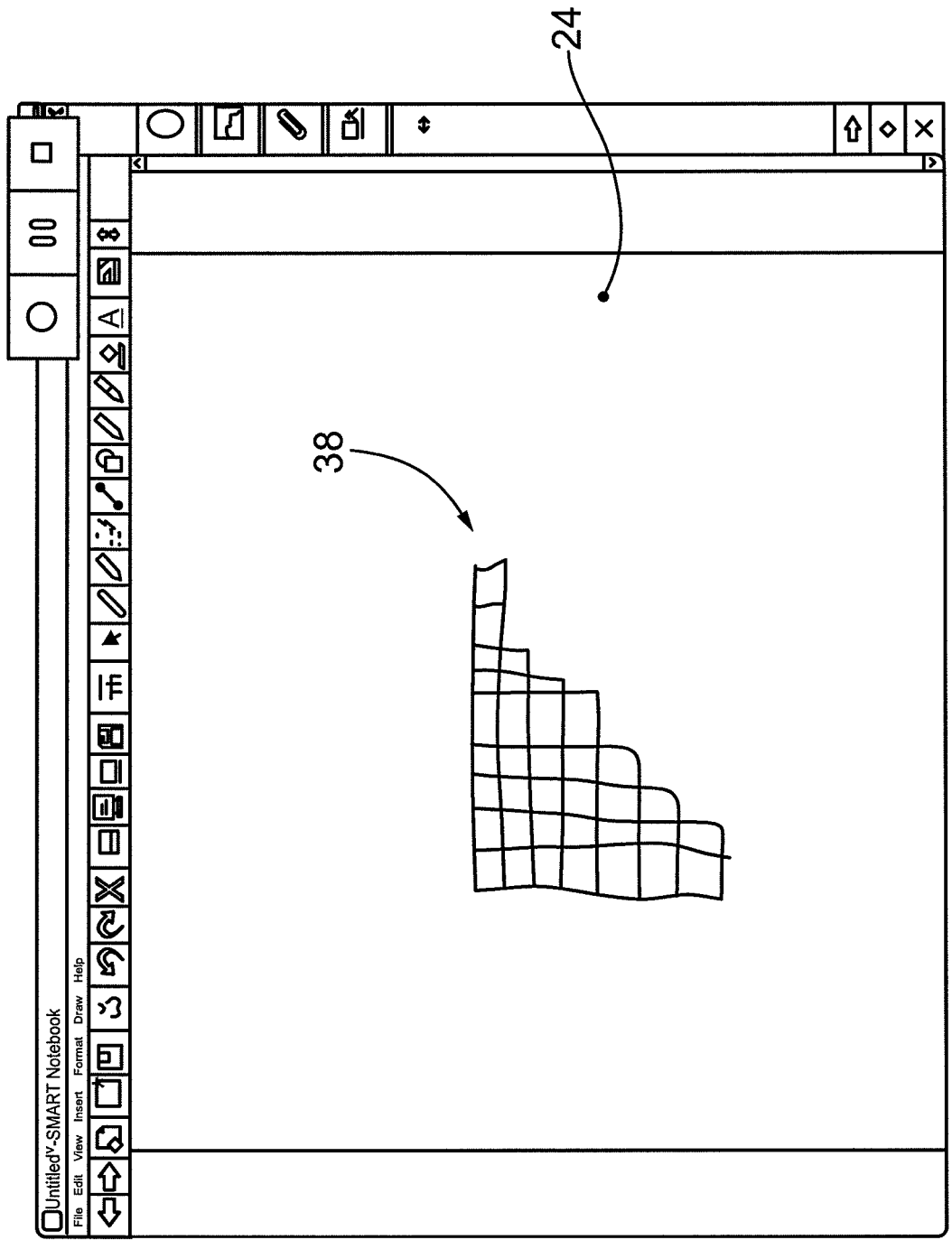
FIGS. 3a to 3c, 4a and 4b show the graphical user interface during irregular hand-drawn table creation and recognition.
Figure 3B:
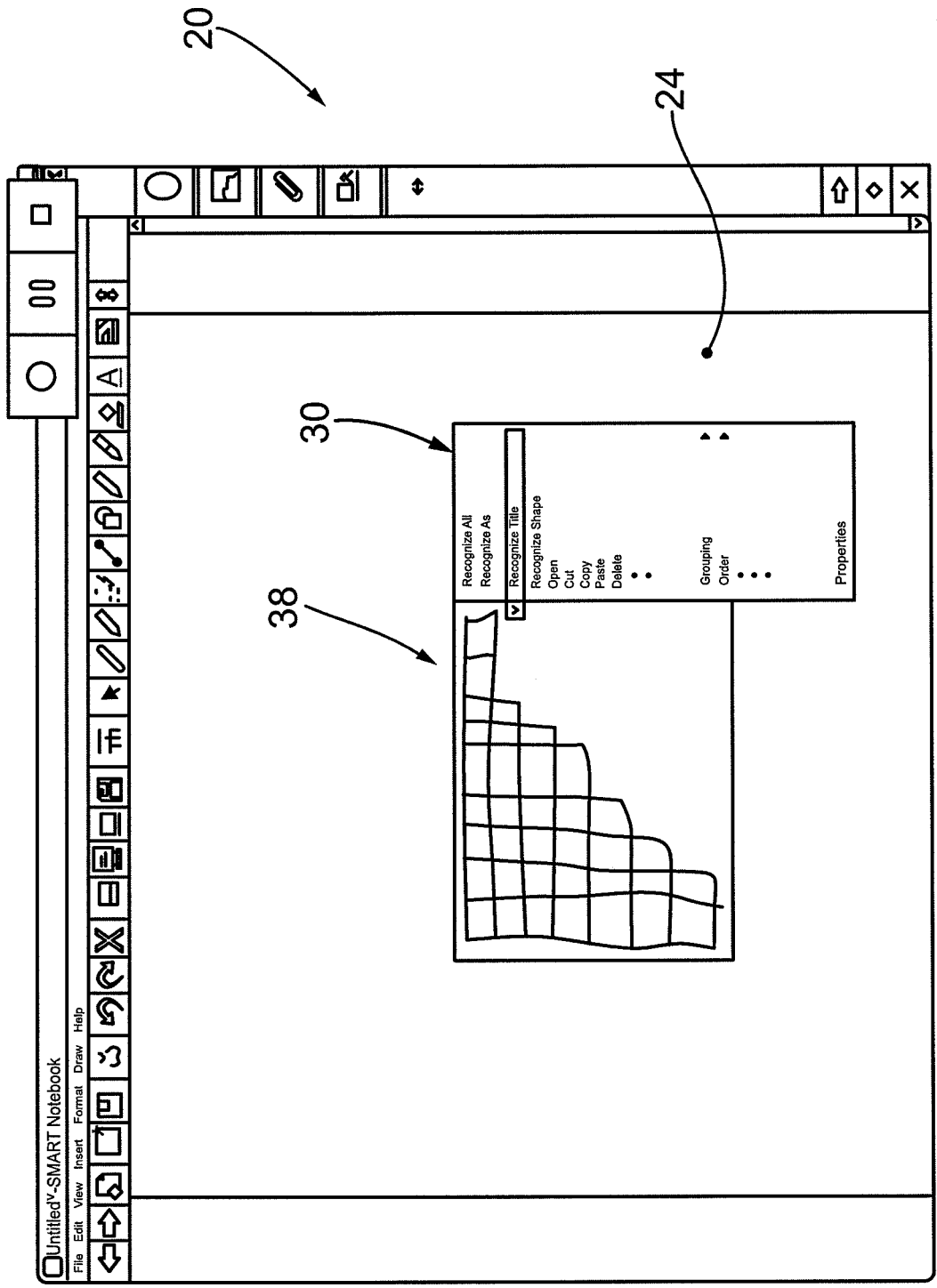
Figure 3C:
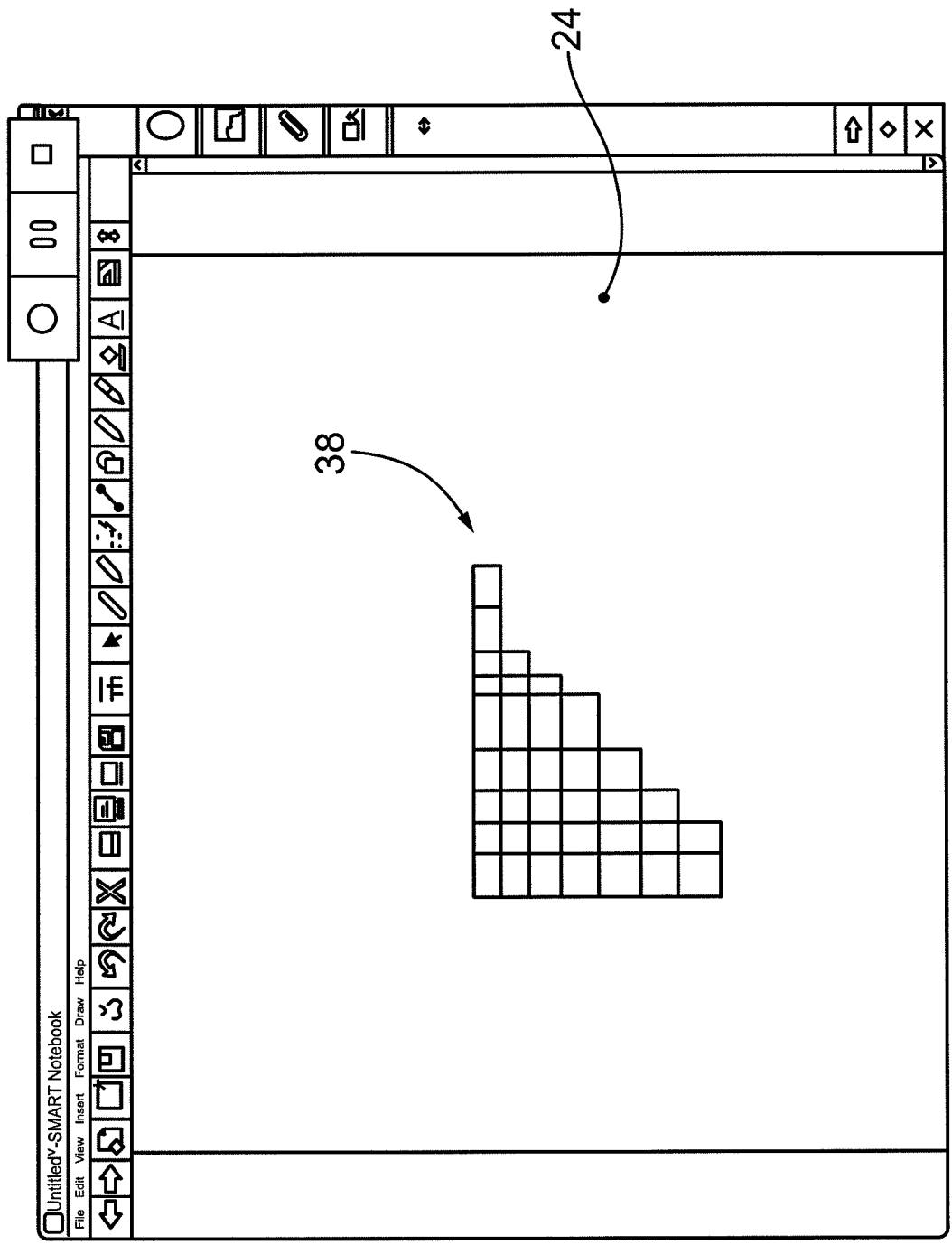
Figure 4A:
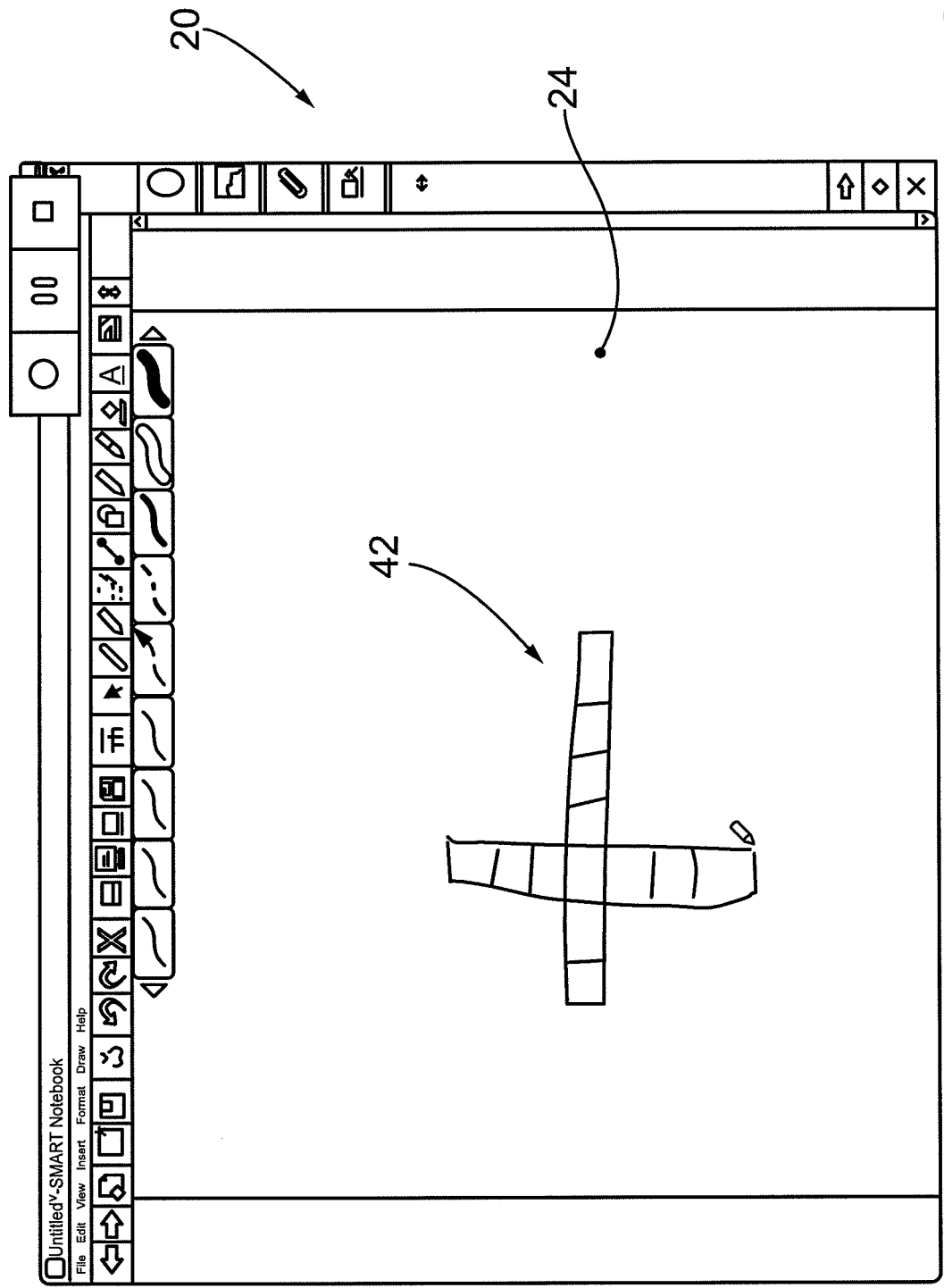
Figure 4B:
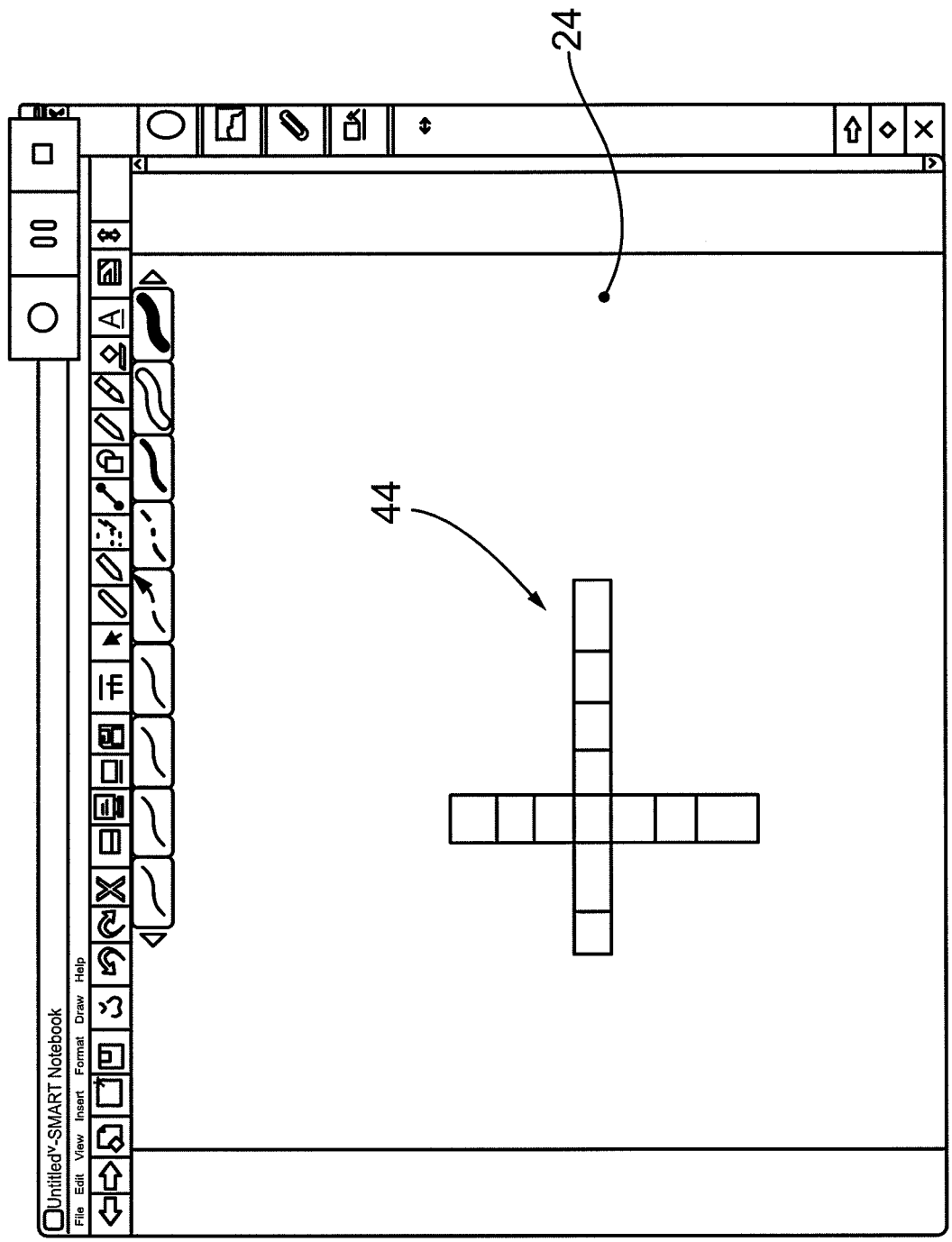

FIGS. 3a to 3c and FIGS. 4a and 4b show irregular shaped hand-drawn tables that have been input on the canvas page 24 of the graphical user interface 20 and then recognized by invoking the hand-drawn table recognizing tool 16. As can be seen in FIGS. 3a to 3c, each row of the hand-drawn table 38 has a different number of cells. The resulting table object 40 has the same configuration of rows with different numbers of cells C. In FIGS. 4a and 4b, the hand-drawn table 42 comprises one row of cells and one column of cells, with the row and column intersecting to form an offset "+". The resulting table object 44 has the same configuration.

Figure 5A:
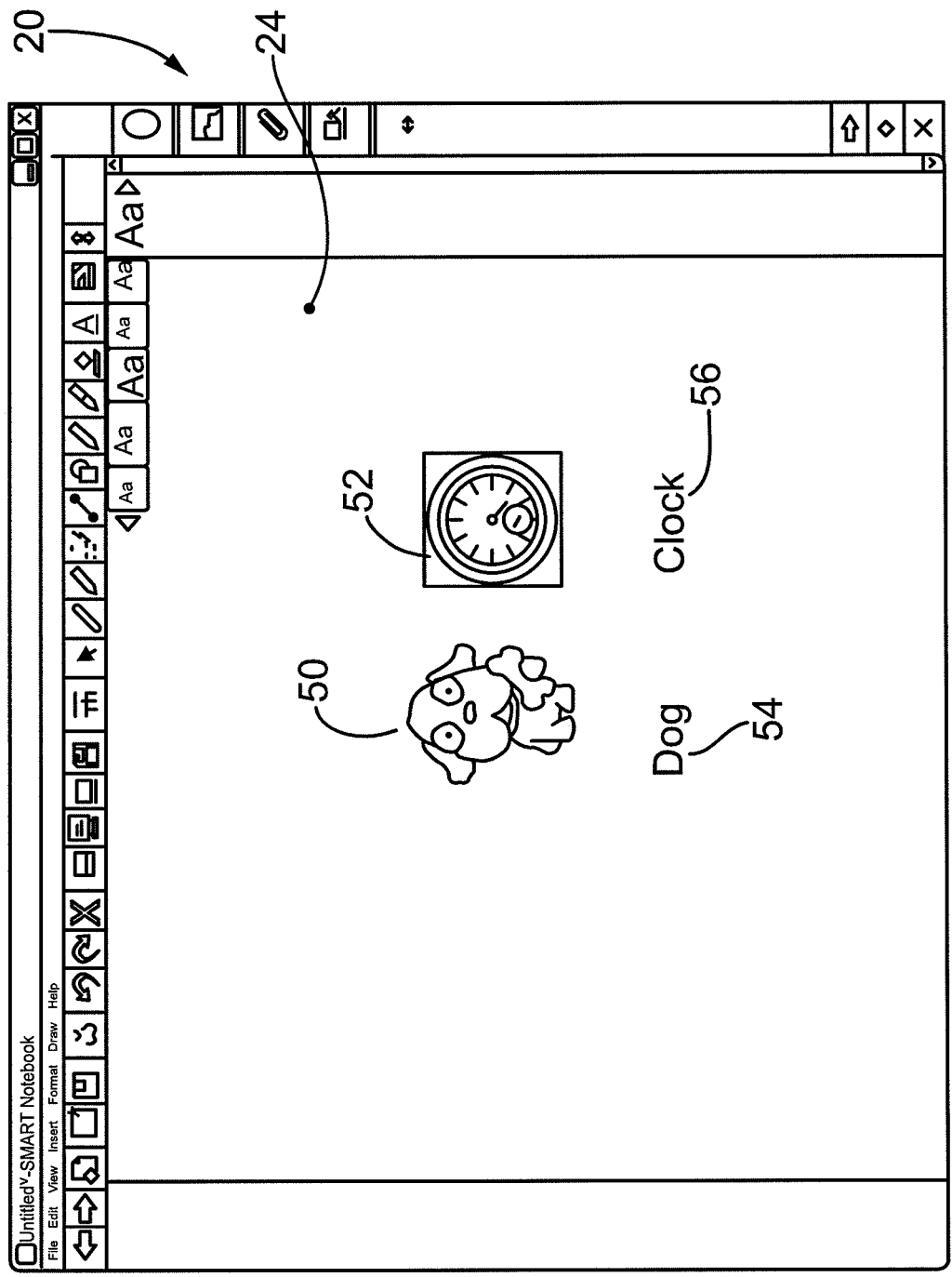
FIGS. 5a to 5d show the graphical user interface during hand-drawn table creation in the presence of picture and text objects and recognition of the created hand-drawn table.
Figure 5B:
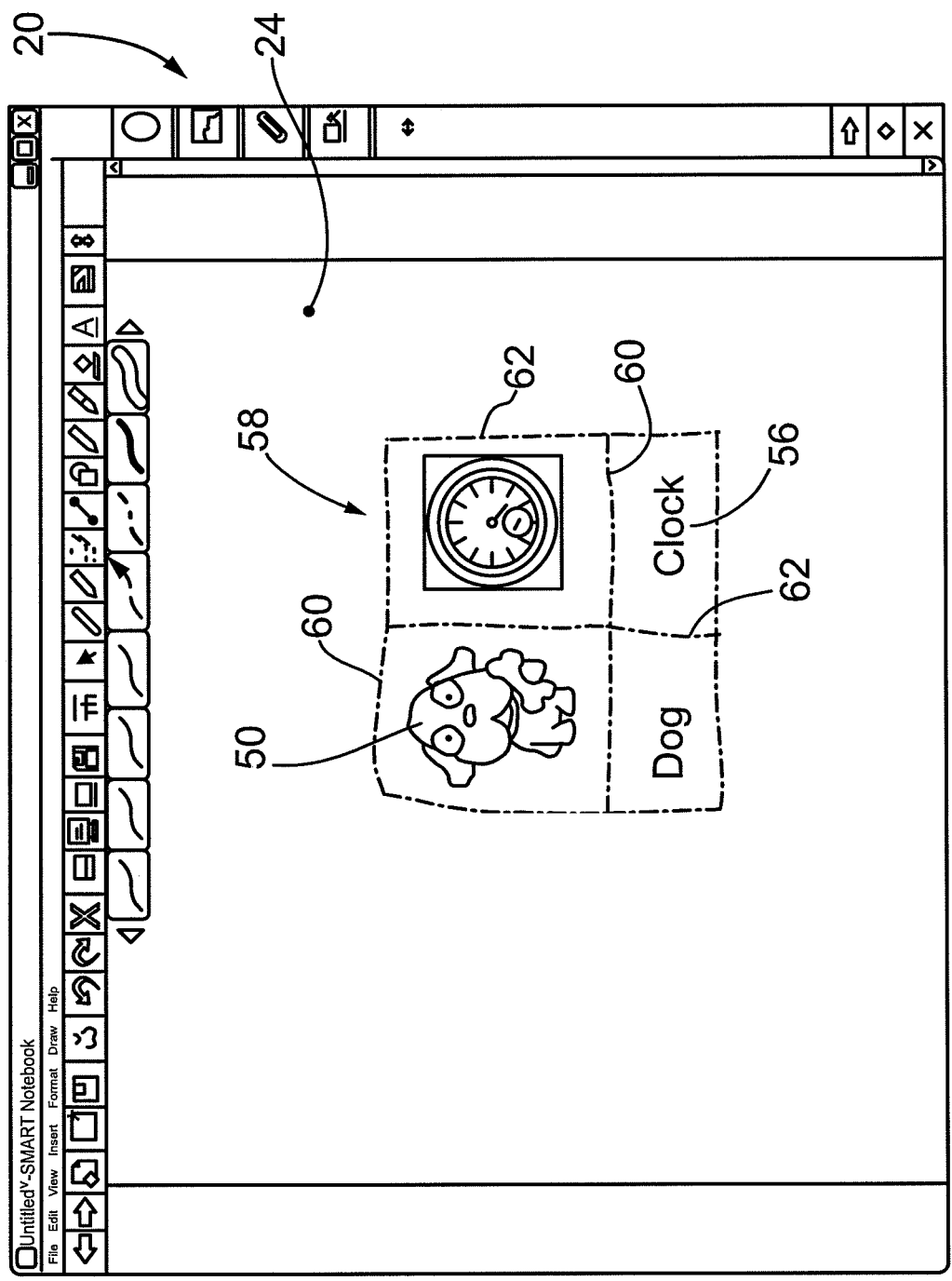
Figure 5C:
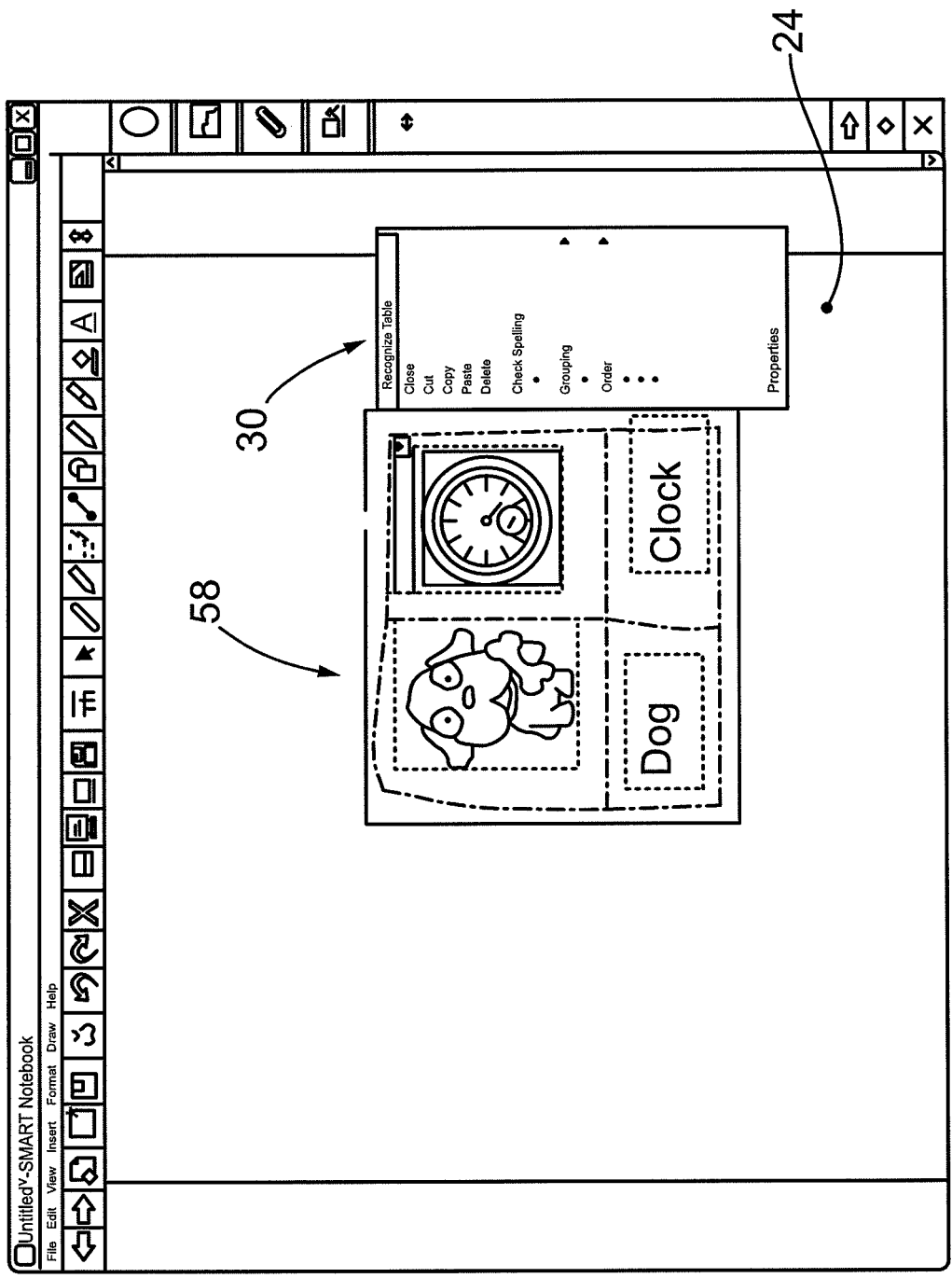
Figure 5D:
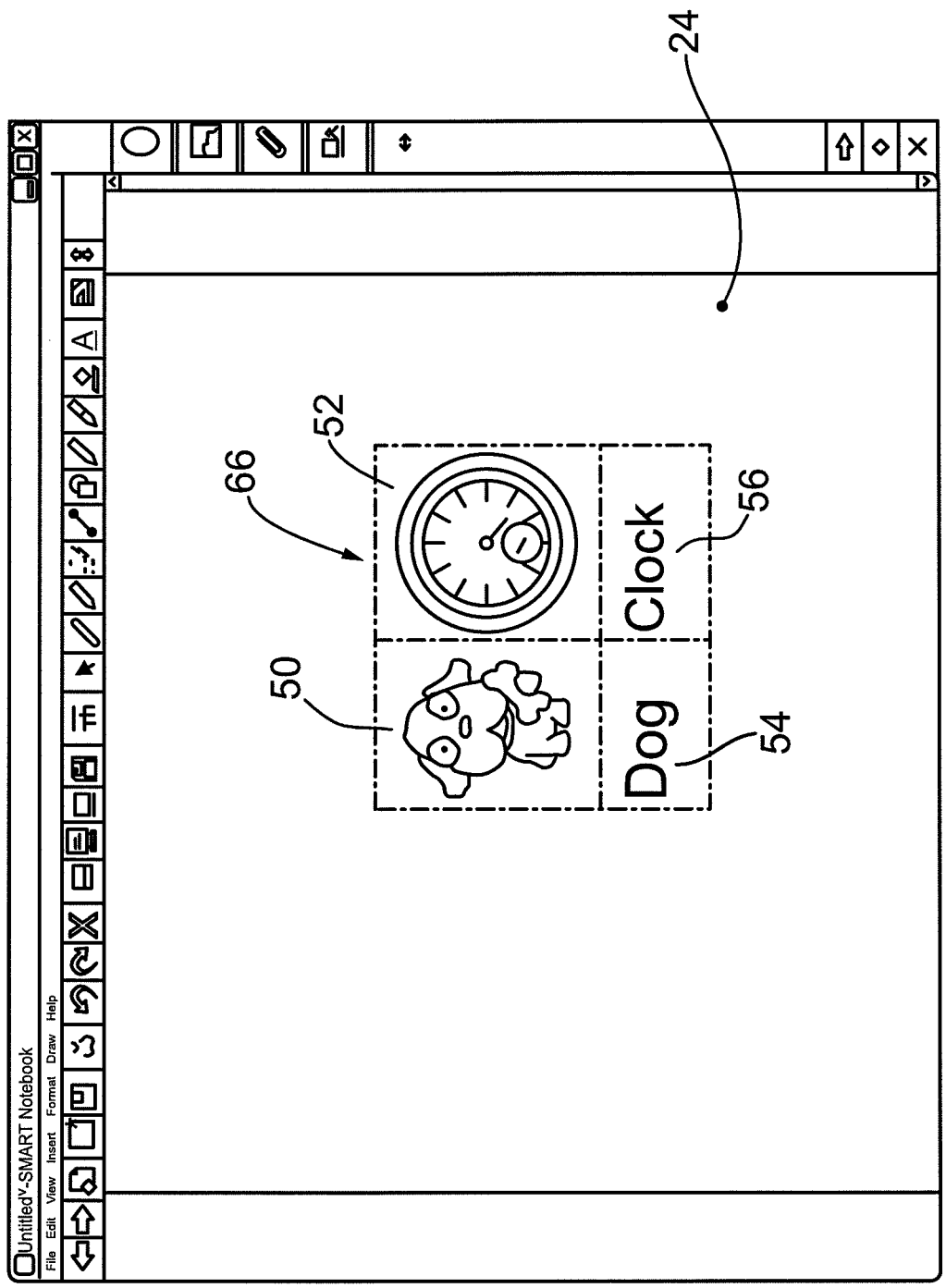

FIG. 5a shows side-by-side picture objects 50 and 52 and associated underlying text objects 54 and 56 that have been input on the canvas page 24 of the graphical user interface 20. In FIG. 5b, a hand-drawn table 58 comprising generally horizontal and vertical freeform lines 60 and 62 respectively has been input so that each of the picture objects 50, 52 and text objects 54, 56 is positioned in a different cell of the hand-drawn table 58. In FIGS. 5c and 5d, the hand-drawn table 58 is selected and the hand-drawn table recognizing tool 16 invoked, resulting in a corresponding table object 66 having the picture and text objects 50 to 56 as table cell content, being generated.

Figure 6:
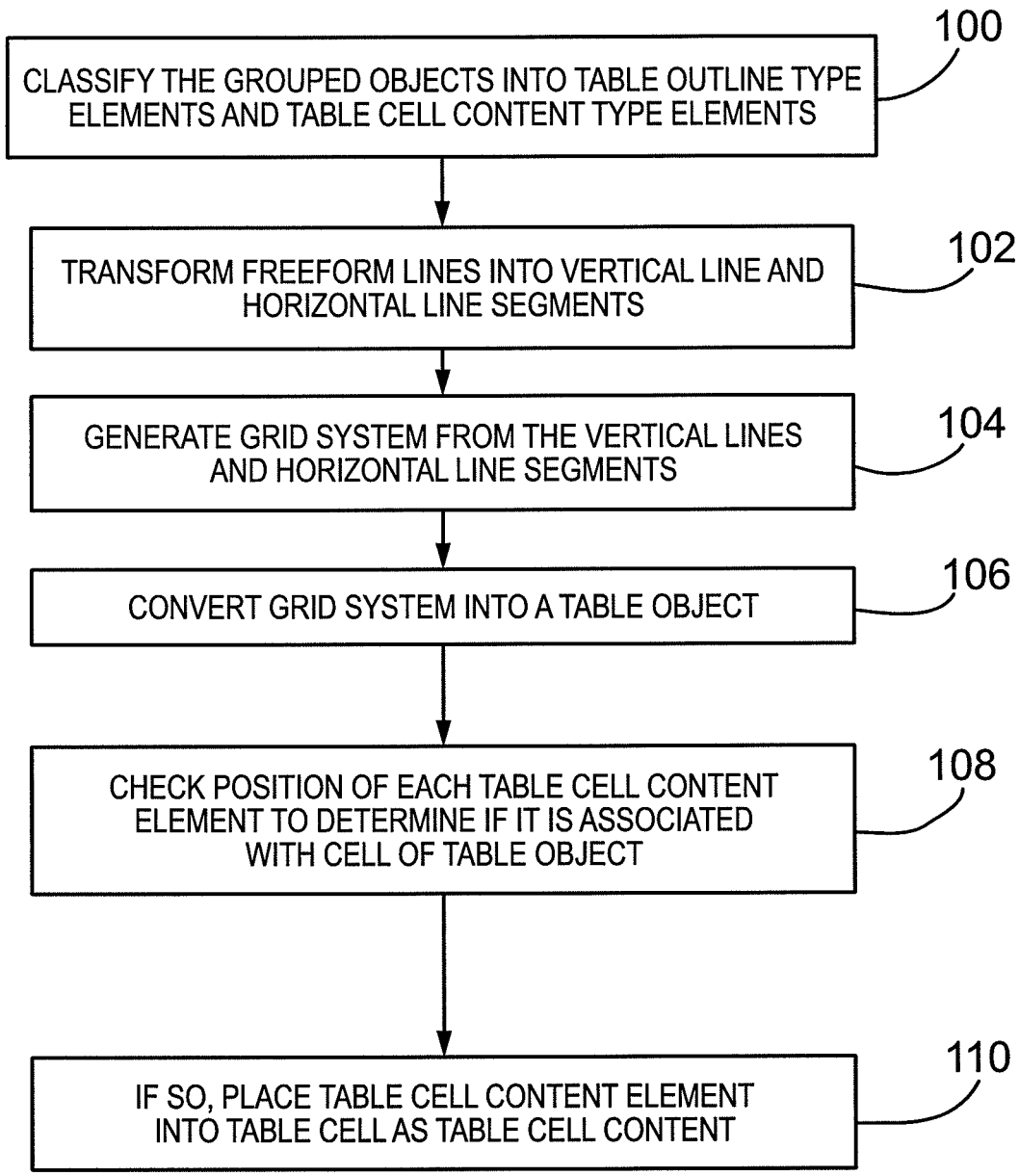
FIG. 6 is a flowchart showing the general steps performed during hand-drawn table recognition.

Turning now to FIG. 6, the general steps performed by the hand-drawn table recognizing tool 16 during hand-drawn table recognition are shown. As can be seen, when the hand-drawn table recognizing tool is invoked, the objects within the selected region of the graphical user interface encompassing the hand-drawn table are classified by the object classifier 16a into one of two groups, namely table outline elements and table cell content elements (step 100). The table outline elements in this embodiment comprise freeform or hand-drawn line objects (i.e. objects represented by a series of (x,y) coordinates and having no associated graphic content object). The table cell content elements comprise all other non-freeform line objects such as for example, Flash™ objects, shape objects, picture objects, text objects, numeric objects, non-line hand-drawn objects, creative pen objects etc. After the objects have been classified, the classified table outline elements are transformed into vertical and horizontal line segments by the freeform line object transformer 16b (step 102). A grid system is then generated by the grid system generator 16c based on the vertical and horizontal line segments, with the grid system comprising a grid list that stores the four corner coordinates of each grid in the grid system (step 104). The generated grid system is then converted into a table object by the table object generator 16d, with each cell of the table object having physical geometry location data corresponding to the four corner coordinates of its corresponding grid in the grid list (step 106). The position of each classified table cell content element is then examined to determine if it is deemed to be associated with a cell of the created table object (step 108). In particular, for each classified table cell content object, the center or other designated location on the classified table cell content object is checked to determine if it falls within a cell of the table object. If so, the classified table cell content element is placed into the table cell as table cell content (step 110).

Figure 7:
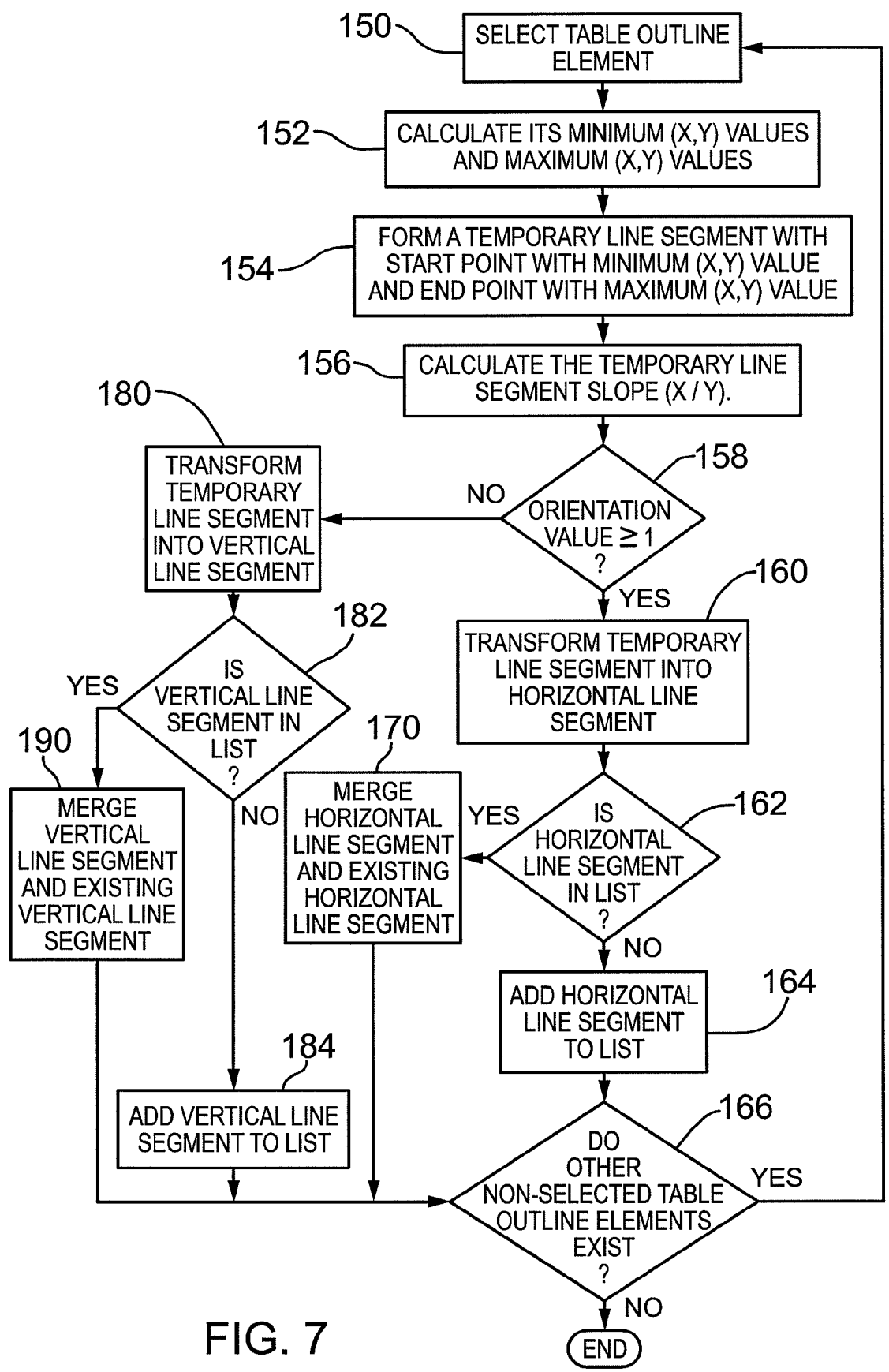
FIG. 7 is a flowchart showing the steps performed during transformation of table outline elements into vertical and horizontal line segments.

The steps performed during transformation of the table outline elements into vertical and horizontal line segments (step 102 of FIG. 6) are better illustrated in FIG. 7. During this process, a classified table outline element is selected (step 150). The minimum $(x_{min}, y_{min})$ coordinates and the maximum $(x_{max}, y_{max})$ coordinates of the selected table outline element are then determined (step 152). A temporary line segment having a start point at the minimum $(x_{min}, y_{min})$ coordinates and an end point at the maximum $(x_{max}, y_{max})$ coordinates is created (step 154). An orientation value for the temporary line segment is calculated according to $$\frac{(x_{max} - x_{min})}{(y_{max} - y_{min})}$$

(step 156) and the orientation value is checked to determine if it is greater than or equal to one (1) (step 158).

If the orientation value of the temporary line segment is greater than or equal to one, the temporary line segment is transformed into a horizontal line segment extending from the minimum x coordinate value to the maximum x coordinate value and having a y coordinate value equal to $(y_{max}+y_{min})/2$ and denoted $y_{avg}$ (step 160). Thus, the horizontal line segment has a start point $(x_{min}, y_{avg})$ and an end point $(x_{max}, y_{avg})$. The horizontal line segment is then compared to a horizontal line segment list to determine if the horizontal line segment is located at substantially the same y coordinate position as a horizontal line segment that already exists in the horizontal line segment list (step 162). In this embodiment, the horizontal line segment is deemed to be at the same y coordinate position as an existing horizontal line segment if the y coordinate of the horizontal line segment is within ten (10) pixels of the y coordinate of an existing horizontal line segment. If the horizontal line segment is deemed to be at the same y coordinate position as an existing horizontal line segment, the start point and end point of the horizontal line segment are compared with the start point and end point of that existing horizontal line segment to determine if the horizontal line segment and the existing horizontal line segment overlap. The horizontal line segment and the existing horizontal line segment are deemed to overlap if one of the following conditions holds true:

$XE_{min} \leq X_{min} \leq XE_{max}$ $XE_{min} \leq X_{max} \leq XE_{max}$ $X_{min} \leq XE_{min} \leq X_{max}$ $X_{min} \leq XE_{max} \leq X_{max}$ where:

$XE_{min}$ and $XE_{max}$ are the x coordinates of the start and end points respectively of the existing horizontal line segment; and $X_{min}$ and $X_{max}$ are the x coordinates of the start and end points respectively of the horizontal line segment.

If the horizontal line segment is determined not to overlap with the existing horizontal line segment, the horizontal line segment is added to the horizontal line segment list (step 164). A check is then made to determine if any other classified table outline element exists that has not been selected (step 166). If no non-selected classified table outline element exists, the process is deemed completed. Otherwise, the process reverts back to step (150) and the next classified table outline element is selected.

At step 162, if the horizontal line segment is determined to overlap with the existing horizontal line segment, the horizontal line segment and existing horizontal line segment are merged to update the start point and end point of the existing horizontal line segment in the horizontal line segment list (step 170). During merging, the start point of the horizontal line segment is checked to determine if it is smaller than the start point of the existing horizontal line segment and the end point of the horizontal line segment is checked to determine if it is greater than the end point of the existing horizontal line segment. If the start point of the horizontal line segment is smaller, the start point of the horizontal line segment is used to overwrite the start point of the existing horizontal line segment in the horizontal line segment list. If the end point of the horizontal line segment is greater, the end point of the horizontal line segment is used to overwrite the end point of the existing horizontal line segment in the horizontal line segment list.

Once the horizontal line segment and existing horizontal line segment have been merged at step 170, the process proceeds to step 166 where a check is made to determine if any other classified table outline element exists that has not been selected.

As step 158, if the orientation value of the temporary line segment is less than one, the temporary line segment is transformed into a vertical line segment extending from the minimum y coordinate value to the maximum y coordinate value and having an x coordinate value equal to $(x_{max}+x_{min})/2$ and denoted $x_{avg}$ (step 180). Thus, the vertical line segment has a start point $(x_{avg}, y_{min})$ and an end point $(x_{avg}, y_{max})$. The vertical line segment is then compared to a vertical line segment list to determine if the vertical line segment is located at substantially the same x coordinate position as a vertical line segment that already exists in the vertical line segment list (step 182). In this embodiment, the vertical line segment is deemed to be at the same x coordinate position as an existing vertical line segment if the x coordinate of the vertical line segment is within ten (10) pixels of the x coordinate of an existing vertical line segment. If the vertical line segment is deemed to be at the same x coordinate position as an existing vertical line segment, the start point and end point of the vertical line segment are compared with the start point and end point of that existing vertical line segment to determine if the vertical line segment and existing vertical line segment overlap. The vertical line segment and the existing vertical line segment are deemed to overlap if one of the following conditions holds true:

$YE_{min} \leq Y_{min} \leq YE_{max}$ $YE_{min} \leq Y_{max} \leq YE_{max}$ $Y_{min} \leq YE_{min} \leq Y_{min}$ $Y_{min} \leq YE_{max} \leq Y_{max}$ where:

$YE_{min}$ and $YE_{max}$ are the y coordinates of the start and end points respectively of the existing vertical line segment; and $Y_{min}$ and $Y_{max}$ are the y coordinates of the start and end points respectively of the vertical line segment.

If the vertical line segment is determined not to overlap with existing vertical line segment, the vertical line segment is added to the vertical line segment list (step 184) and the process proceeds to step 166 where check is made to determine if any other classified table outline element exists that has not been selected.

At step 182, if the vertical line segment is determined to overlap with the existing vertical line segment, the vertical line segment and existing vertical line segment are merged to update the start point and end point of the existing vertical line segment in the vertical line segment list (step 190). During merging, the start point of the vertical line segment is checked to determine if it is smaller than the start point of the existing vertical line segment and the end point of the vertical line segment is checked to determine if it is greater than the end point of the existing vertical line segment. If the start point of the vertical line segment is smaller, the start point of the vertical line segment is used to overwrite the start point of the existing vertical line segment. If the end point of the vertical line segment is greater, the end point of the vertical line segment is used to overwrite the end point of the existing vertical line segment.

Once the vertical line segment and existing vertical line segment have been merged at step 190, the process proceeds to step 166 where a check is made to determine if any other classified table outline elements exists that has not been selected.

Figure 8:
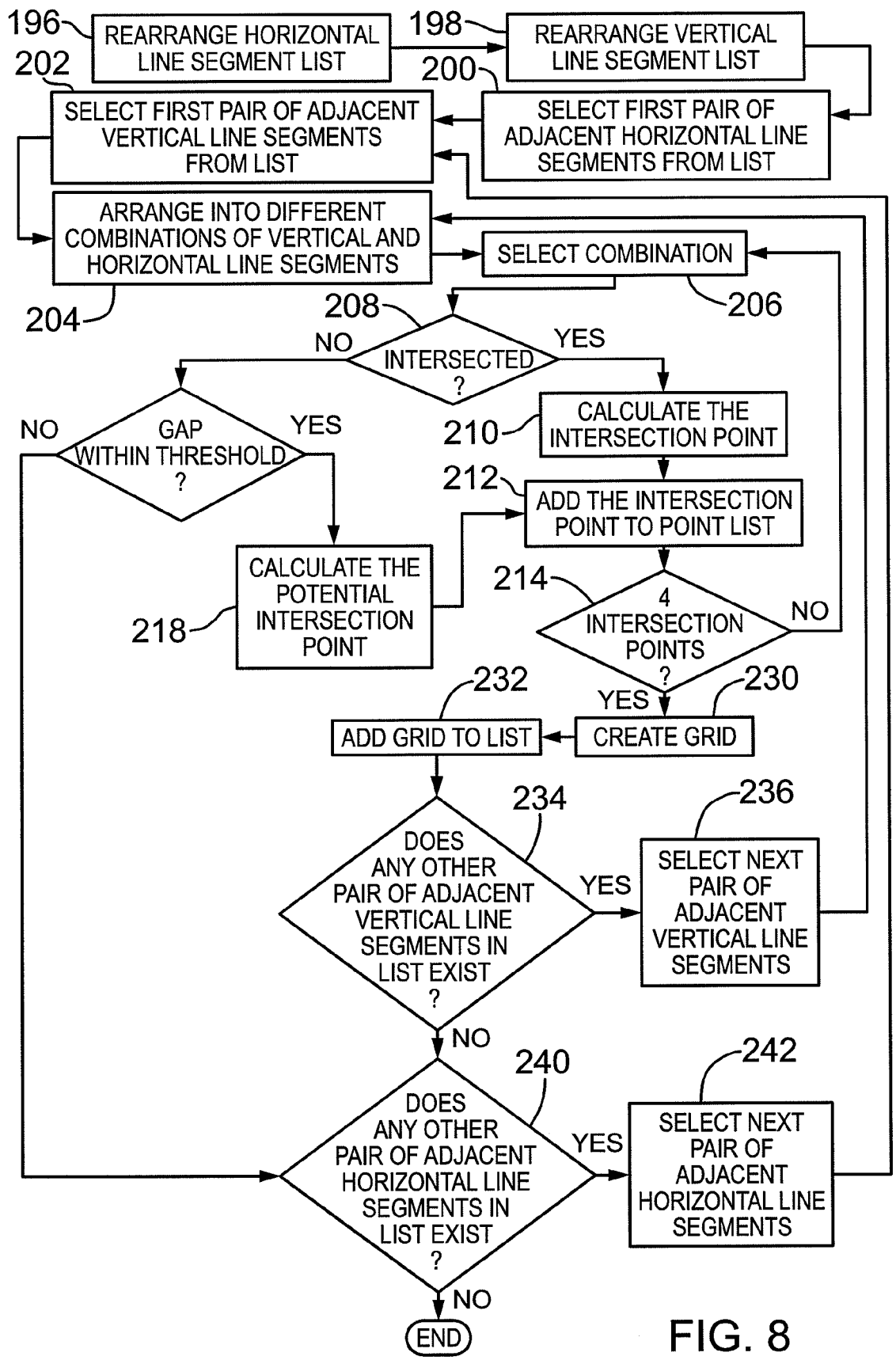
FIG. 8 is a flowchart showing the steps performed during grid system generation.

The steps performed during generation of the grid system (step 104 in FIG. 6) are better illustrated in FIG. 8. The horizontal line segments in the horizontal line segment list are arranged from top to bottom so that the horizontal line segment having the highest y coordinate is at the beginning of the list and the horizontal line segment having the lowest y coordinate is at the end of the list (step 196). The vertical line segments in vertical line segment the list are arranged from left to right so that the vertical line segment having the lowest x coordinate is at the beginning of the list and the vertical line segment having the highest x coordinate is at the end of the list (step 198). The first pair of adjacent horizontal line segments is then selected from the horizontal line segment list (step 200) and the first pair of adjacent vertical line segments is selected from the vertical line segment list (step 202). The selected horizontal and vertical line segments are then arranged to form four (4) different combinations of line segments with each combination comprising one horizontal line segment and one vertical line segment (step 204). A first combination of vertical and horizontal line segments is then selected (step 206) and the vertical and horizontal line segments of the selected combination are checked to determine if they intersect (step 208).

If the vertical and horizontal line segments of the selected combination intersect, the intersection point is calculated (step 210) and the calculated intersection point is added to an intersection point list (step 212). A check is then made to determine if the intersection point list comprises four (4) intersection points (step 214). If not, the process reverts back to step 206 and the next combination of vertical and horizontal lines segments is selected.

At step 208, if the vertical line segment and horizontal line segment of the selected combination do not intersect, a check is made to determine if the gap separating the horizontal and vertical line segments of the selected combinations is within a threshold, in this example one (1) pixel (step 216). If the gap separating the horizontal and vertical line segments is within the threshold, the horizontal and vertical line segments are deemed to intersect and the effective intersection point is calculated (step 218). The process then proceeds to step 212 where the calculated effective intersection point is added to the intersection point list.

At step 214, if the intersection point list comprises four intersection points, a grid is created having corners corresponding to the (x,y) coordinates of the four intersection points (step 230) and the grid is added to the grid system list (step 232). Following this, a check is made to determine if another pair of adjacent vertical line segments exists in the vertical line segment list that has not been selected (step 234). If another pair of non-selected adjacent vertical line segments exists in the vertical line segment list, the next pair of adjacent vertical line segments in the vertical line segment list is selected (step 236) and the process reverts back to step 204. In this manner, each pair of adjacent vertical line segments in the vertical line segment list is compared to the selected pair of adjacent horizontal line segments to determine the intersection points therebetween and thereby determine the coordinates of a row of horizontal grids in the grid system.

At step 234, if no pair of non-selected adjacent vertical line segments exists, a check is made to determine if another pair of adjacent horizontal line segments exists in the horizontal line segment list that has not been selected (step 240). If another pair of non-selected adjacent horizontal line segments exists in the horizontal line segment list, the next pair of adjacent horizontal line segments in the horizontal line segment list is selected (step 242) and the process reverts back to step 202. Steps 202 to 236 are then repeated for the next pair of adjacent horizontal line segments to determine the intersection points between the vertical line segments and the horizontal line segments and thereby determine the coordinates of the next row of horizontal grids in the grid system. At step 240, if no pair of non-selected adjacent horizontal line segments exists, the grid system generation process is deemed complete.

At step 216, if the gap separating the horizontal and vertical line segments of the selected combination is beyond the threshold, the process proceeds to step 240 to determine if another pair of adjacent horizontal line segments exists in the horizontal line segment list that has not been selected.

Once the table object has been created and table cell content placed in the cells of the table object, if appropriate, the table object can be further processed depending on the table cell content placed in the cells. For example, if numeric objects are placed in the cells of the table object, the table object can be treated as a spreadsheet and operations performed similar to other spreadsheet programs such as for example Excel™. In this case, placing a hand-drawn object resembling a "+" in the cell at the end of one of the cell rows or columns invokes a summation operation so that the sum of the numeric objects in that one row or column is calculated and displayed in the cell having the "+" object therein. Of course, other operations can be invoked by placing objects representing those operations in cells of the table object.

Although particular values for the thresholds described above are provided, those of skill in the art will appreciate that the threshold values may be changed to relax or tighten the process to suit the particular environment in which the hand-drawn table recognizing tool 16 is employed. Also, rather than calculating the run versus rise of each table outline element, other techniques can be employed to determine the orientation of the freeform lines. In addition, although the above embodiment describes freeform line objects as being recognized as the table outline elements, if desired, selected combinations of freeform line objects and shape objects may also be recognized as table outline elements.

If desired, when each table outline element is selected at step 150, the table outline element can be processed to make a determination as to whether the table outline element represents a table line or other non-table line such as handwriting. This can be achieved for example by analyzing maximum deviations of the line coordinates in given directions or by calculating derivatives. Alternatively, the user may be provided with the ability to designate non-table lines using an input gesture.

Although the hand-drawn table recognizing tool 16 has been described with specific reference to its implementation in the SMART Notebook™ application, those of skill in the art will appreciate that the hand-drawn table recognition tool may be used as a stand alone tool or implemented as a feature in other digital ink software environments to facilitate the creation of table objects from hand-drawn freeform lines.

The hand-drawn table recognition tool 16 may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable medium include for example read-only memory, random-access memory, flash memory, CD-ROMs, magnetic tape, optical data storage devices and other storage media. The computer readable program code can also be distributed over a network including coupled computer systems so that the computer readable program code is stored and executed in a distributed fashion.

Although embodiments have been described with reference to the drawings, those of skill in the art will appreciate that variations and modifications may be made without departing from the spirit and scope thereof as defined by the appended claims.

What is claimed is:

1. A computerized method of recognizing an input hand-drawn table formed by freeform line objects, said method comprising:
    transforming each freeform line object of said table into one of a vertical line segment and a horizontal line segment;
    generating a grid system based on the vertical and horizontal line segments; and
    converting the generated grid system into a table object, wherein said transforming comprises, for each freeform line object:
        determining the start point and end point of the freeform line object;
        generating a temporary line segment extending between the determined start point and end point;
        determining the orientation of said temporary line segment;
        based on the determined orientation, creating one of said vertical line segment and horizontal line segment;
        for each created horizontal line segment, determining whether it overlaps with an existing horizontal line segment and, if so, merging the created and existing horizontal line segments; and
        for each created vertical line segment, determining whether it overlaps with an existing vertical line segment and, if so, merging the created and existing vertical line segments,
    wherein said transforming further comprises:
        comparing each created horizontal line segment with a horizontal line segment list to determine if it overlaps with an existing horizontal line segment;
        if not, adding the created horizontal line segment to the list and, if so, performing the merging;
        comparing each created vertical line segment with a vertical line segment list to determine if it overlaps with an existing vertical line segment: and
        if not, adding the created vertical line segment to the list and, if so, performing the merging, and
    wherein said transforming further comprises, prior to said comparing to determine overlap:
        examining each horizontal line segment to determine if it is within a threshold vertical distance of an existing horizontal line segment in the horizontal line segment list;
        if so, performing said comparing to determine overlap and, if not, bypassing the overlap comparing and adding the horizontal line segment to the list;
        examining each vertical line segment to determine if it is within a threshold horizontal distance of an existing vertical line segment in the vertical line segment list; and
        if so, performing said comparing to determine overlap and, if not, bypassing the overlap comparing and adding the vertical line segment to the list.

2. The method of claim 1 wherein said grid system is generated based on deemed intersections of the horizontal and vertical line segments.

3. The method of claim 2 wherein said grid system generating comprises:
    selecting pairs of adjacent vertical and adjacent horizontal line segments; and
    for each pair of adjacent vertical line segments and each pair of adjacent horizontal line segments, determining the intersection points therebetween thereby to yield four corner coordinates of each grid in the grid system.

4. The method of claim 3 wherein said grid system generating comprises:
    for each pair of adjacent vertical line segments and each pair of adjacent horizontal line segments, arranging the vertical and horizontal line segments into different combinations, each combination comprising one vertical line segment and one horizontal line segment; and
    for each combination, calculating the intersection point between the vertical and horizontal line segments thereby to calculate said corner coordinates.

5. The method of claim 4 further comprising calculating an effective intersection point for each combination of non-intersecting vertical and horizontal line segments that are within a threshold separation distance.

6. The method of claim 3 wherein said converting comprises using the four corner coordinates of each grid to define corners of a corresponding cell of said table object.

7. The method of claim 6 wherein said grid system generating comprises:
    for each pair of adjacent vertical line segments and each pair of adjacent horizontal line segments, arranging the vertical and horizontal line segments into different combinations, each combination comprising one vertical line segment and one horizontal line segment; and
    for each combination, calculating the intersection point between the vertical and horizontal line segments thereby to calculate said corner coordinates.

8. The method of claim 6 wherein said transforming further comprises:
    for each created horizontal line segment, determining whether it overlaps with an existing horizontal line segment and, if so, merging the created and existing horizontal line segments; and for each created vertical line segment, determining whether it overlaps with an existing vertical line segment and, if so, merging the created and existing vertical line segments.

9. The method of claim 1 further comprising:
detecting input non-freeform line objects that are within the table object; and
inserting the detected non-freeform line objects as table object content.

10. The method of claim 9 wherein during said inserting, each detected non-freeform line object is placed into a corresponding cell of said table object as table cell content.

11. The method of claim 10 wherein said detecting comprises determining non-freeform line objects having designated locations positioned within a cell of the table object.

12. The method of claim 10 further comprising processing the table object based on the table cell content placed in the table object.

13. The method of claim 12, wherein processing the table object comprises:
recognizing the content in a first table cell as a predetermined processing indicator;
processing the content in one or more table cells differing from said first table cell according to the recognized processing indicator; and
replacing the content in said first table cell with the result of the processing.

14. The method of claim 13 wherein the content in the first table cell is a hand-drawn object.

15. The method of claim 14 wherein said processing indicator is a mathematical plus sign and wherein the result of the processing is a summation.

16. A computerized method of recognizing an input hand-drawn table formed by freeform line objects, said method comprising:
transforming each freeform line object of said table into one of a vertical line segment and a horizontal line segment;
generating a grid system based on the vertical and horizontal line segments wherein said grid system is generated based on deemed intersections of the horizontal and vertical line segments;
converting the generated grid system into a table object;
detecting input non-freeform line objects that are within the table object; and
inserting the detected non-freeform line objects as table object content, wherein during said inserting, each detected non-freeform table object is placed into a corresponding cell of said table object as table cell content;
calculating an effective intersection point for each combination of non-intersecting vertical and horizontal line segments that are within a threshold separation distance wherein said grid system generating comprises:
selecting pairs of adjacent vertical and adjacent horizontal line segments: and
for each pair of adjacent vertical line segments and each pair of adjacent horizontal line segments, determining the intersection points therebetween thereby to yield four corner coordinates of each grid in the grid system
for each pair of adjacent vertical line segments and each pair of adjacent horizontal line segments, arranging the vertical and horizontal line segments into different combinations, each combination comprising one vertical line segment and one horizontal line segment; and
for each combination, calculating the intersection point between the vertical and horizontal line segments thereby to calculate said corner coordinates.

17. The method of claim 16 wherein said transforming comprises for each freeform line object:
examining the orientation of the freeform line object; and
creating one of the horizontal and vertical line segment representing the freeform line object based on the orientation thereof.

18. The method of claim 17 wherein said transforming further comprises for each freeform line object:
determining the start point and end point of the freeform line object;
generating a temporary line segment extending between the determined start point and end point;
determining the orientation of said temporary line segment; and
based on the determined orientation, creating one of said horizontal line segment and vertical line segment.

19. The method of claim 18 wherein said transforming further comprises:
for each created horizontal line segment, determining whether it overlaps with an existing horizontal line segment and, if so, merging the created and existing horizontal line segments; and
for each created vertical line segment, determining whether it overlaps with an existing vertical line segment and, if so, merging the created and existing vertical line segments.

20. The method of claim 19 wherein said grid system is generated based on deemed intersections of the horizontal and vertical line segments.

21. The method of claim 20 wherein said grid system generating comprises:
selecting pairs of adjacent vertical and adjacent horizontal line segments; and
for each pair of adjacent vertical line segments and each pair of adjacent horizontal line segments, determining the intersection points therebetween thereby to yield four corner coordinates of each grid in the grid system.

22. The method of claim 21 wherein said grid system generating comprises:
for each pair of adjacent vertical line segments and each pair of adjacent horizontal line segments, arranging the vertical and horizontal line segments into different combinations, each combination comprising one vertical line segment and one horizontal line segment; and
for each combination, calculating the intersection point between the vertical and horizontal line segments thereby to calculate said corner coordinates.

23. The method of claim 16 wherein said detecting comprises determining non-freeform line objects having designated locations positioned within a cell of the table object.

24. The method of claim 16 further comprising processing the table object based on the table cell content placed in the table object.

25. The method of claim 24 wherein processing the table object comprises:
recognizing the content in a first table cell as a predetermined processing indicator;
processing the content in one or more table cells differing from said first table cell according to the recognized processing indicator; and
replacing the content in said first table cell with the result of the processing.

26. The method of claim 25 wherein the content in the first table cell is a hand-drawn object.

27. The method of claim 26 wherein said processing indicator is a mathematical plus sign and wherein the result of the processing is a summation.

28. The method of claim 16 wherein said converting comprises using the four corner coordinates of each grid to define corners of a corresponding cell of said table object.

29. The method of claim 28 wherein said grid system generating comprises:
for each pair of adjacent vertical line segments and each pair of adjacent horizontal line segments, arranging the vertical and horizontal line segments into different combinations, each combination comprising one vertical line segment and one horizontal line segment; and
for each combination, calculating the intersection point between the vertical and horizontal line segments thereby to calculate said corner coordinates.

30. A non-transitory computer readable medium embodying computer program code for recognizing an input hand-drawn table formed by freeform line objects, said computer program code comprising:
program code for transforming each freeform line object of said table into one of a vertical line segment and a horizontal line segment;
program code for generating a grid system based on the vertical and horizontal line segments; and
program code for converting the generated grid system into a table object, wherein said program code for transforming comprises, for each freeform line object:
program code for determining the start point and end point of the freeform line object;
program code for generating a temporary line segment extending between the determined start point and end point;
program code for determining the orientation of said temporary line segment;
program code for, based on the determined orientation, creating one of said vertical line segment and horizontal line segment;
program code for, for each created horizontal line segment, determining whether it overlaps with an existing horizontal line segment and, if so, merging the created and existing horizontal line segments; and
program code for, for each created vertical line segment, determining whether it overlaps with an existing vertical line segment and, if so, merging the created and existing vertical line segments
wherein the program code for transforming further includes:
program code for comparing each created horizontal line segment with a horizontal line segment list to determine if it overlaps with an existing horizontal line segment:
if not, adding the created horizontal line segment to the list and, if so, performing the merging;
program code for comparing each created vertical line segment with a vertical line segment list to determine if it overlaps with an existing vertical line segment; and
if not, adding the created vertical line segment to the list and, if so, performing the merging, and
wherein said program code for transforming further comprises, prior to said comparing to determine overlap:
program code for examining each horizontal line segment to determine if it is within a threshold vertical distance of an existing horizontal line segment in the horizontal line segment list;
if so, performing said comparing to determine overlap and, if not, bypassing the overlap comparing and adding the horizontal line segment to the list:
program code for examining each vertical line segment to determine if it is within a threshold horizontal distance of an existing vertical line segment in the vertical line segment list: and
if so, performing said comparing to determine overlap and, if not, bypassing the overlap comparing and adding the vertical line segment to the list.

31. An interactive input system comprising:
a coordinate input device having a display surface on which an image is presented, said coordinate input device being responsive to user input; and
processing structure communicating with said coordinate input device and updating the image presented on said display surface to reflect user input, said processing structure executing a table recognition procedure when invoked to recognize a hand-drawn table entered on said coordinate input device and convert the recognized hand-drawn table into a table object, wherein during said hand-drawn table recognition, said processing structure transforms each freeform line object forming said hand-drawn table into one of a vertical line segment and a horizontal line segment, generates a grid system based on the vertical and horizontal line segments, converts the generated grid system into said table object, detects input non-freeform line objects that are within the table object and inserts the detected non-freeform line objects as table object content, wherein during said inserting, each detected non-freeform line object is placed into a corresponding cell of said table object as table cell content
wherein said processing structure further:
compares each created horizontal line segment with a horizontal line segment list to determine if it overlaps with an existing horizontal line segment:
if not, adds the created horizontal line segment to the list and, if so, performs a merging of the created and existing horizontal line segments;
compares each created vertical line segment with a vertical line segment list to determine if it overlaps with an existing vertical line segment; and
if not, adds the created vertical line segment to the list and, if so, performs a merging of the created and existing vertical line segments, and
wherein said processing structure further, prior to the comparing to determine overlap:
examines each horizontal line segment to determine if it is within a threshold vertical distance of an existing horizontal line segment in the horizontal line segment list:
if so, performs the comparing to determine overlap and, if not, bypasses the overlap comparing and adds the horizontal line segment to the list;
examines each vertical line segment to determine if it is within a threshold horizontal distance of an existing vertical line segment in the vertical line segment list; and
if so, performs the comparing to determine overlap and, if not, bypasses the overlap comparing and adds the vertical line segment to the list.

32. An interactive input system according to claim 31 wherein said processing structure invokes the table recognition procedure in response to user input.

33. A computerized method of recognizing an input hand-drawn table formed by freeform line objects, said method comprising:
   transforming each freeform line object of said table into one of a vertical line segment and a horizontal line segment, wherein said transforming comprises, for each freeform line object:
      determining the start point and end point of the freeform line object;
      generating a temporary line segment extending between the determined start point and end point;
      determining the orientation of said temporary line segment; and
      based on the determined orientation, creating one of said vertical line segment and horizontal line segment;
   generating a grid system based on the vertical and horizontal line segments;
   converting the generated grid system into a table object;
   detecting input non-freeform line objects that are within the table object; and
   inserting the detected non-freeform line objects as table object content, wherein during said inserting, each detected non-freeform line object is placed into a corresponding cell of said table object as table cell content
   wherein said transforming further comprises:
      comparing each created horizontal line segment with a horizontal line segment list to determine if it overlaps with an existing horizontal line segment;
      if not, adding the created horizontal line segment to the list and, if so, performing a merging of the created and existing horizontal line segments;
      comparing each created vertical line segment with a vertical line segment list to determine if it overlaps with an existing vertical line segment; and
      if not, adding the created vertical line segment to the list and, if so, performing a merging of the created and existing vertical line segments, and
   wherein said transforming further comprises, prior to said comparing to determine overlap:
      examining each horizontal line segment to determine if it is within a threshold vertical distance of an existing horizontal line segment in the horizontal line segment list;
      if so, performing said comparing to determine overlap and, if not, bypassing the overlap comparing and adding the horizontal line segment to the list;
      examining each vertical line segment to determine if it is within a threshold horizontal distance of an existing vertical line segment in the vertical line segment list; and
      if so, performing said comparing to determine overlap and, if not, bypassing the overlap comparing and adding the vertical line segment to the list.

34. The method of claim 33 wherein said detecting comprises determining non-freeform line objects having designated locations positioned within a cell of the table object.

35. The method of claim 33 further comprising processing the table object based on the table cell content placed in the table object.

36. The method of claim 35 wherein processing the table object comprises:
   recognizing the content in a first table cell as a predetermined processing indicator;
   processing the content in one or more table cells differing from said first table cell according to the recognized processing indicator; and
   replacing the content in said first table cell with the result of the processing.

37. The method of claim 36 wherein the content in the first table cell is a hand-drawn object.

38. The method of claim 37 wherein said processing indicator is a mathematical plus sign and wherein the result of the processing is a summation.

* * * * *